(12) United States Patent
Mishra

(10) Patent No.: US 7,729,286 B2
(45) Date of Patent: *Jun. 1, 2010

(54) METHOD, SYSTEM AND APPARATUS FOR TELECOMMUNICATIONS SERVICE MANAGEMENT

(75) Inventor: Richard Mishra, London (GB)

(73) Assignee: Amdocs Systems Limited, Bath (GB)

( * ) Notice: Subject to any disclaimer, the term of this patent is extended or adjusted under 35 U.S.C. 154(b) by 927 days.

This patent is subject to a terminal disclaimer.

(21) Appl. No.: 11/285,755

(22) Filed: Nov. 22, 2005

(65) Prior Publication Data

US 2007/0081523 A1 Apr. 12, 2007

(30) Foreign Application Priority Data

Oct. 7, 2005 (GB) ................... 0520463.1

(51) Int. Cl.
*H04L 12/28* (2006.01)
*G06F 15/173* (2006.01)

(52) U.S. Cl. ........................ 370/254; 709/223

(58) Field of Classification Search ................ 709/224, 709/249

See application file for complete search history.

(56) References Cited

U.S. PATENT DOCUMENTS

| | | | |
|---|---|---|---|
| 5,054,111 A | 10/1991 | Goodwin | 455/34 |
| 5,185,860 A | 2/1993 | Wu | 395/200 |
| 5,186,729 A | 2/1993 | Brown et al. | 65/33 |
| 5,208,877 A | 5/1993 | Murphy et al. | 385/12 |
| 5,821,937 A | 10/1998 | Tonelli et al. | 345/356 |
| 5,831,610 A | 11/1998 | Tonelli et al. | 345/335 |
| 5,864,541 A | 1/1999 | Abu-Amara et al. | 370/253 |
| 5,886,907 A | 3/1999 | Abu-Amara et al. | 364/578 |
| 5,905,715 A | 5/1999 | Azarmi et al. | 370/244 |
| 5,943,480 A | 8/1999 | Neidhardt | 395/200.56 |
| 5,963,911 A | 10/1999 | Walker et al. | 705/7 |
| 6,055,240 A | 4/2000 | Tunnicliffe | 370/428 |
| 6,075,631 A | 6/2000 | Bala et al. | 359/124 |
| 6,091,713 A | 7/2000 | Lechleider et al. | 370/248 |

(Continued)

FOREIGN PATENT DOCUMENTS

CA 2 290 221 A1 5/2000

(Continued)

OTHER PUBLICATIONS

International Search Report from related PCT Application No. PCT/GB2006/003741 mailed on Dec. 21, 2006.

(Continued)

*Primary Examiner*—Gregory B Sefcheck
(74) *Attorney, Agent, or Firm*—Zilka-Kotab, PC

(57) ABSTRACT

A method of processing service information relating to a plurality of user services available in a telecommunications system is disclosed. The method includes storing entities defining service components in a service information database, where each service component entity represents a distinct aspect of service functionality which can be provided by the telecommunications system. Entities defining implementation technologies are also stored, each implementation technology entity being associated with a service component entity and representing a technology that can be used for implementing the aspect of service functionality represented by the service component entity. The method further stores entities defining user services available to users of the telecommunications system, each user service entity being associated with one or more service component entities defining service functionality aspects of the user service.

31 Claims, 5 Drawing Sheets

U.S. PATENT DOCUMENTS

| | | | |
|---|---|---|---|
| 6,094,580 A | 7/2000 | Yu et al. | 455/446 |
| 6,097,722 A | 8/2000 | Graham et al. | 370/395 |
| 6,101,538 A | 8/2000 | Brown | 709/223 |
| 6,108,702 A | 8/2000 | Wood | 709/224 |
| 6,141,552 A | 10/2000 | Sendonaris et al. | 455/436 |
| 6,151,305 A | 11/2000 | Chen | 370/238 |
| 6,151,512 A | 11/2000 | Chheda et al. | 455/562 |
| 6,173,175 B1 | 1/2001 | Alazma et al. | 455/423 |
| 6,173,186 B1 | 1/2001 | Dalley | 455/446 |
| 6,185,519 B1 | 2/2001 | Lin et al. | 703/21 |
| 6,188,914 B1 | 2/2001 | Chheda | 455/562 |
| 6,215,771 B1 | 4/2001 | Turner et al. | 370/235 |
| 6,223,219 B1 | 4/2001 | Uniacke et al. | 709/223 |
| 6,226,273 B1 | 5/2001 | Busuioc et al. | 370/270 |
| 6,229,540 B1 | 5/2001 | Tonelli et al. | 345/356 |
| 6,247,049 B1 | 6/2001 | Scott | 709/222 |
| 6,253,065 B1 | 6/2001 | Palmer | 455/67.3 |
| 6,266,694 B1 | 7/2001 | Duguay et al. | 709/223 |
| 6,295,540 B1 | 9/2001 | Sanschagrin et al. | 707/201 |
| 6,308,174 B1 | 10/2001 | Hayball et al. | 707/10 |
| 6,310,883 B1 | 10/2001 | Mann et al. | 370/408 |
| 6,314,093 B1 | 11/2001 | Mann et al. | 370/351 |
| 6,314,109 B1 | 11/2001 | Oman | 370/467 |
| 6,321,253 B1 | 11/2001 | McKeen et al. | 709/204 |
| 6,336,035 B1 | 1/2002 | Somoza et al. | 455/446 |
| 6,351,213 B1 | 2/2002 | Hirsch | 340/506 |
| 6,356,627 B1 | 3/2002 | Hayball et al. | 379/112.01 |
| 6,363,420 B1 | 3/2002 | Coward | 709/221 |
| 6,393,475 B1 | 5/2002 | Leong et al. | 709/223 |
| 6,396,810 B1 | 5/2002 | Hebel | 370/248 |
| 6,405,248 B1 | 6/2002 | Wood | 709/223 |
| 6,408,312 B1 | 6/2002 | Forthman et al. | 707/203 |
| 6,411,798 B1 | 6/2002 | Frenkel et al. | 455/67.4 |
| 6,420,968 B1 | 7/2002 | Hirsch | 340/506 |
| 6,445,782 B1 | 9/2002 | Elfe et al. | 379/201.01 |
| 6,449,253 B1 | 9/2002 | Ott | 370/231 |
| 6,477,566 B1 | 11/2002 | Davis et al. | 709/223 |
| 6,477,568 B2 | 11/2002 | Borrett et al. | 709/223 |
| 6,480,718 B1 | 11/2002 | Tse | 455/446 |
| 6,490,621 B1 | 12/2002 | Forget et al. | 709/224 |
| 6,522,883 B2 | 2/2003 | Titmuss et al. | 455/445 |
| 6,529,877 B1 | 3/2003 | Murphy et al. | 705/7 |
| 6,539,221 B1 | 3/2003 | Vasudevan et al. | 455/423 |
| 6,560,204 B1 | 5/2003 | Rayes | 370/253 |
| 6,563,795 B1 | 5/2003 | Gruber et al. | 370/248 |
| 6,578,005 B1 | 6/2003 | Lesaint et al. | 705/8 |
| 6,600,749 B1 | 7/2003 | Hayball et al. | 370/400 |
| 6,628,952 B1 | 9/2003 | Hankins et al. | 455/446 |
| 6,643,837 B2 | 11/2003 | Campbell et al. | 716/12 |
| 6,684,247 B1 | 1/2004 | Santos et al. | 709/224 |
| 6,704,287 B1 | 3/2004 | Moharram | 370/242 |
| 6,707,795 B1 | 3/2004 | Noorhosseini et al. | 370/242 |
| 6,728,688 B1 | 4/2004 | Hirsch et al. | 706/11 |
| 6,744,739 B2 | 6/2004 | Martin | 370/254 |
| 6,766,165 B2 | 7/2004 | Sharma et al. | 455/423 |
| 6,766,364 B2 | 7/2004 | Moyer et al. | 709/221 |
| 6,771,873 B2 | 8/2004 | Premaratne et al. | 385/147 |
| 6,802,044 B2 | 10/2004 | Campbell et al. | 716/2 |
| 6,810,419 B1 | 10/2004 | Bogler et al. | 709/224 |
| 6,832,074 B2 | 12/2004 | Borras-Chia et al. | 455/67.13 |
| 6,836,466 B1 | 12/2004 | Kant et al. | 370/252 |
| 6,836,748 B2 | 12/2004 | Stupp | 702/183 |
| 6,842,463 B1 | 1/2005 | Drwiega et al. | 370/468 |
| 6,857,014 B1 | 2/2005 | Paterson et al. | 709/223 |
| 6,862,291 B2 | 3/2005 | Talpade et al. | 370/412 |
| 6,865,151 B1 | 3/2005 | Saunders | 370/230 |
| 6,882,657 B1 | 4/2005 | Werner et al. | 370/437 |
| 6,892,169 B1 | 5/2005 | Campbell et al. | 703/1 |
| 6,901,440 B1 | 5/2005 | Bimm et al. | 709/223 |
| 6,914,881 B1 | 7/2005 | Mansfield et al. | 370/230 |
| 6,944,631 B2 | 9/2005 | Peter | 707/104.1 |
| 6,996,510 B1 | 2/2006 | Reilly et al. | 703/13 |
| 7,043,661 B2 | 5/2006 | Valadarsky et al. | 714/4 |
| 7,463,604 B2 * | 12/2008 | Zellner et al. | 370/329 |
| 2001/0051503 A1 | 12/2001 | Lush | 455/2.01 |
| 2002/0010773 A1 * | 1/2002 | Meleis | 709/223 |
| 2002/0091588 A1 | 7/2002 | Benton et al. | 705/27 |
| 2002/0103850 A1 | 8/2002 | Moyer et al. | 709/202 |
| 2002/0103898 A1 | 8/2002 | Moyer et al. | 709/224 |
| 2002/0114309 A1 | 8/2002 | Chow et al. | 370/347 |
| 2002/0120733 A1 | 8/2002 | Kring | 709/223 |
| 2002/0124091 A1 | 9/2002 | Kurose et al. | 709/228 |
| 2002/0131374 A1 | 9/2002 | Lee | 370/254 |
| 2002/0152297 A1 * | 10/2002 | Lebourg et al. | 709/223 |
| 2002/0169858 A1 | 11/2002 | Bellinger et al. | 709/220 |
| 2003/0115028 A1 | 6/2003 | Summerfield et al. | 703/6 |
| 2003/0140142 A1 | 7/2003 | Marples et al. | 709/225 |
| 2003/0185205 A1 | 10/2003 | Beshai | 370/370 |
| 2004/0081161 A1 | 4/2004 | Held et al. | 370/395.3 |
| 2004/0088417 A1 | 5/2004 | Bober et al. | 709/227 |
| 2004/0095914 A1 | 5/2004 | Katsube et al. | 370/338 |
| 2004/0107085 A1 | 6/2004 | Moosburger et al. | 703/13 |
| 2004/0146008 A1 | 7/2004 | Conradt et al. | 370/241 |
| 2004/0165562 A1 | 8/2004 | Elaoud et al. | 370/338 |
| 2004/0172412 A1 | 9/2004 | Files et al. | 707/104.1 |
| 2004/0243716 A1 | 12/2004 | Ryll | 709/232 |
| 2004/0259565 A1 | 12/2004 | Lucidarme | 455/453 |
| 2005/0010468 A1 | 1/2005 | Power | 705/10 |
| 2005/0076339 A1 | 4/2005 | Merril et al. | 718/104 |
| 2005/0132027 A1 | 6/2005 | Vicente et al. | 709/220 |
| 2005/0202811 A1 | 9/2005 | Abed et al. | 455/426.2 |
| 2006/0224470 A1 * | 10/2006 | Garcia Ruano et al. | 705/27 |

FOREIGN PATENT DOCUMENTS

| | | |
|---|---|---|
| CA | 2 405 263 A1 | 10/2001 |
| CA | 2 401 714 A1 | 5/2003 |
| CA | 2 489 304 A1 | 11/2004 |
| CA | 2 451 947 A1 | 6/2005 |
| CH | 686 540 A5 | 4/1996 |
| CH | 691 419 A5 | 7/2001 |
| DE | 40 41 442 C1 | 6/1992 |
| DE | 42 42 808 A1 | 6/1994 |
| DE | 197 40 718 A1 | 9/1999 |
| DE | 198 21 461 A1 | 11/1999 |
| DE | 199 16 632 A1 | 4/2000 |
| DE | 199 24 988 A1 | 12/2000 |
| DE | 101 58 080 A1 | 6/2003 |
| DE | 102 10 742 A1 | 10/2003 |
| DE | 102 26 315 A1 | 1/2004 |
| DE | 103 00 709 A1 | 8/2004 |
| DE | 103 11 697 A1 | 10/2004 |
| DE | 103 18 292 A1 | 11/2004 |
| DE | 103 37 464 A1 | 12/2004 |
| DE | 103 38 053 A1 | 3/2005 |
| EP | 0 673 135 A1 | 3/1994 |
| EP | 0 619 682 A2 | 10/1994 |
| EP | 0 762 712 A2 | 3/1997 |
| EP | 0 847 213 A2 | 6/1998 |
| EP | 0 854 607 A1 | 7/1998 |
| EP | 0 899 910 A2 | 3/1999 |
| EP | 0 899 911 A2 | 3/1999 |
| EP | 0 899 912 A2 | 3/1999 |
| EP | 0 899 913 A2 | 3/1999 |
| EP | 0 914 016 A2 | 5/1999 |
| EP | 0 923 269 A2 | 6/1999 |
| EP | 0 923 270 A2 | 6/1999 |
| EP | 0 963 077 A2 | 12/1999 |
| EP | 0 977 460 A2 | 2/2000 |
| EP | 1 026 867 A2 | 8/2000 |
| EP | 1 043 871 A2 | 10/2000 |
| EP | 1 091 614 A2 | 4/2001 |
| EP | 1 098 245 A1 | 5/2001 |
| EP | 1 102 433 A2 | 5/2001 |

| | | | | | | |
|---|---|---|---|---|---|---|
| EP | 1 109 413 | A1 | 6/2001 | WO | 01/75702 A1 | 10/2001 |
| EP | 1 111 840 | A2 | 6/2001 | WO | 01/75703 A1 | 10/2001 |
| EP | 1 150 455 | A2 | 10/2001 | WO | 01/75704 A1 | 10/2001 |
| EP | 1 172 967 | A2 | 1/2002 | WO | 01/76267 A1 | 10/2001 |
| EP | 1 221 667 | A1 | 7/2002 | WO | 01/84329 A1 | 11/2001 |
| EP | 1 231 739 | A1 | 8/2002 | WO | 01/84331 A1 | 11/2001 |
| EP | 1 298 505 | A1 | 4/2003 | WO | 01/84787 A1 | 11/2001 |
| EP | 1 298 838 | A1 | 4/2003 | WO | 01/89141 A2 | 11/2001 |
| EP | 1 298 839 | A1 | 4/2003 | WO | 01/91369 A1 | 11/2001 |
| EP | 1 298 840 | A1 | 4/2003 | WO | 02/06918 A2 | 1/2002 |
| EP | 1 313 261 | A1 | 5/2003 | WO | WO02/06973 A1 | 1/2002 |
| EP | 1 326 370 | A1 | 7/2003 | WO | WO 02/09355 A2 | 1/2002 |
| EP | 1 326 453 | A1 | 7/2003 | WO | 02/13034 A1 | 2/2002 |
| EP | 0 943 196 | B1 | 11/2003 | WO | 02/17526 A2 | 2/2002 |
| EP | 1 378 841 | A1 | 1/2004 | WO | 02/23804 A2 | 3/2002 |
| EP | 1 398 905 | A1 | 3/2004 | WO | 02/046927 A2 | 6/2002 |
| EP | 1 401 146 | A1 | 3/2004 | WO | 02/47325 A2 | 6/2002 |
| EP | 1 437 859 | A1 | 7/2004 | WO | 02/47326 A2 | 6/2002 |
| EP | 1 445 909 | A1 | 8/2004 | WO | 02/47332 A2 | 6/2002 |
| EP | 1 460 798 | A1 | 9/2004 | WO | 02/47333 A2 | 6/2002 |
| EP | 1 460 859 | A1 | 9/2004 | WO | 02/056249 A2 | 7/2002 |
| EP | 1 460 860 | A1 | 9/2004 | WO | 02/058407 A2 | 7/2002 |
| EP | 1 467 516 | A1 | 10/2004 | WO | 02/065726 A2 | 8/2002 |
| EP | 1 533 940 | A1 | 5/2005 | WO | 02/071691 A2 | 9/2002 |
| GB | 2 318 478 | A | 4/1998 | WO | 02/075651 A2 | 9/2002 |
| GB | 2 319 710 | A | 5/1998 | WO | 02/078363 A1 | 10/2002 |
| GB | 2 332 832 | A | 6/1999 | WO | 02/080055 A2 | 10/2002 |
| GB | 2 338 860 | A | 12/1999 | WO | 02/103959 A2 | 12/2002 |
| GB | 2 344 963 | A | 6/2000 | WO | 03/007546 A2 | 1/2003 |
| GB | 2 393 606 | A | 3/2004 | WO | 03/009160 A1 | 1/2003 |
| GB | 2 431 067 | A | 4/2007 | WO | 03/012704 A1 | 2/2003 |
| WO | 94/11970 | | 5/1994 | WO | 03/017571 A2 | 2/2003 |
| WO | 95/23482 | | 8/1995 | WO | 03/021415 A1 | 3/2003 |
| WO | WO 96/08102 | | 3/1996 | WO | 03/021468 A1 | 3/2003 |
| WO | WO 9608102 A1 * | | 3/1996 | WO | 03/023665 A1 | 3/2003 |
| WO | 96/42173 | | 12/1996 | WO | 03/027910 A2 | 4/2003 |
| WO | 97/23101 | | 6/1997 | WO | 03/039070 A2 | 5/2003 |
| WO | 98/29992 | | 7/1998 | WO | 03/039082 A1 | 5/2003 |
| WO | 98/30061 | | 7/1998 | WO | 03/041325 A2 | 5/2003 |
| WO | 98/33334 | | 7/1998 | WO | 03/041340 A1 | 5/2003 |
| WO | 98/47307 | | 10/1998 | WO | 03/043262 A1 | 5/2003 |
| WO | 98/53399 | | 11/1998 | WO | 03/046752 A1 | 6/2003 |
| WO | 99/00965 | | 1/1999 | WO | 03/046781 A1 | 6/2003 |
| WO | 99/03245 | | 1/1999 | WO | 03/053075 A2 | 6/2003 |
| WO | 99/09489 | | 2/1999 | WO | 03/055143 A1 | 7/2003 |
| WO | 99/17194 | | 4/1999 | WO | WO 03/061199 A1 | 7/2003 |
| WO | 99/22491 | | 5/1999 | WO | WO 03061199 A1 * | 7/2003 |
| WO | 99/37102 | | 7/1999 | WO | 03/081556 A1 | 10/2003 |
| WO | 99/63777 | | 12/1999 | WO | 03/081844 A1 | 10/2003 |
| WO | 00/08569 | | 2/2000 | WO | 03/084198 A1 | 10/2003 |
| WO | 00/26743 | | 5/2000 | WO | 03/091918 A1 | 11/2003 |
| WO | 00/36788 | | 6/2000 | WO | 03/098462 A1 | 11/2003 |
| WO | 00/57597 | | 9/2000 | WO | 03/102829 A1 | 12/2003 |
| WO | 01/03374 A1 | | 1/2001 | WO | 2004/002172 A1 | 12/2003 |
| WO | 01/03378 A1 | | 1/2001 | WO | 2004/004214 A | 1/2004 |
| WO | 01/13595 A1 | | 2/2001 | WO | 2004/006507 A2 | 1/2004 |
| WO | 01/24448 A1 | | 4/2001 | WO | 2004/008283 A2 | 1/2004 |
| WO | 01/25991 A1 | | 4/2001 | WO | 2004/008689 A1 | 1/2004 |
| WO | 01/29663 A1 | | 4/2001 | WO | 2004/008783 A1 | 1/2004 |
| WO | 01/29722 A2 | | 4/2001 | WO | 2004/023719 A3 | 3/2004 |
| WO | 01/35576 A2 | | 5/2001 | WO | 2004/027580 A2 | 4/2004 |
| WO | 01/47148 A2 | | 6/2001 | WO | 2004/032447 A2 | 4/2004 |
| WO | 01/54350 A2 | | 7/2001 | WO | WO2004/034640 A2 | 4/2004 |
| WO | 01/54376 A3 | | 7/2001 | WO | 2004/045142 A1 | 5/2004 |
| WO | 01/54425 A2 | | 7/2001 | WO | 2004/047325 A1 | 6/2004 |
| WO | 01/55854 A1 | | 8/2001 | WO | 2004/064322 A1 | 7/2004 |
| WO | 01/58189 A1 | | 8/2001 | WO | 2004/088443 A1 | 10/2004 |
| WO | 01/69466 A1 | | 9/2001 | WO | 2004/107790 A1 | 12/2004 |
| WO | 01/72056 A2 | | 9/2001 | WO | 2005/013142 A1 | 2/2005 |
| WO | 01/74043 A3 | | 10/2001 | WO | 2005/017707 A2 | 2/2005 |
| WO | 01/75589 A2 | | 10/2001 | WO | 2005/034428 A2 | 4/2005 |
| WO | 01/75669 A1 | | 10/2001 | WO | 2005/067223 A1 | 7/2005 |
| WO | 01/75701 A1 | | 10/2001 | | | |

WO 2005/071900 A1 8/2005

OTHER PUBLICATIONS

International Preliminary Report on Patentability from PCT Application No. PCT/GB2006/003741 issued on Apr. 9, 2008.

International Preliminary Report on Patentability from PCT Application No. PCT/GB2006/003741 issued on Apr. 9, 2008.

GB Office Action from GB Application No. GB0808223.2 mailed on Sep. 4, 2009.

* cited by examiner

METHOD, SYSTEM AND APPARATUS FOR TELECOMMUNICATIONS SERVICE MANAGEMENT

RELATED APPLICATIONS

This application claims a benefit of priority under 35 U.S.C. §119 to U.K. Patent Application No. 0520463.1 by inventor Richard Mishra entitled "Telecommunications Service Management" filed on Oct. 7, 2005, the entire contents of which are hereby expressly incorporated by reference for all purposes.

TECHNICAL FIELD OF THE INVENTION

The present invention relates to management and/or modeling of telecommunications services, and in particular embodiments to methods and apparatus for processing service information relating to a plurality of user services available in a telecommunications system.

BACKGROUND OF THE INVENTION

Modern telecommunications networks provide ever more complex services to end-users (one recent example being mobile video telephony). Correspondingly, the processes involved in provisioning such user services are also rapidly growing in complexity, and often involve complicated setup and configuration processes involving a wide range of networking technologies. From a technical perspective, user services thus represent complex sets of service characteristics, including software and hardware configuration settings and procedures.

Service providers attempt to hide this technical complexity from end-users to some extent, usually by representing specific defined combinations of service characteristics as distinct service offerings. Such service offerings are typically referred to in the art as 'telecommunications products'. Accordingly, the term 'product' will be used herein to refer to a defined combination of service features and characteristics which together specify a service available to users of a telecommunications system.

Though these 'products' do not correspond to products in a conventional sense, they can serve as useful abstractions of the underlying telecommunications functionality and its technical complexity, and can simplify the technical processes involved in provisioning services. However, to achieve this, effective telecommunications product management tools and methodologies are needed.

Existing product management systems for telecommunications services tend to rely on workflow-based approaches, where the product definition is embedded in the service provisioning process, and domain managers (DMs) are invoked directly from various points in the workflow. Though this can work reasonably well where the product-to-technology relationship is close and simple, it does mean that the characteristics of a product are hard to see and hard to maintain. This can result in many thousands of often closely related products being managed, each with attendant launch and maintenance costs, as well as confusion for the end-user and constraints on the ability of the service provider to implement rationalizations. It also often directly ties products to implementing technologies, further adding to the proliferation of very similar products that differ only in being supported by different technologies. Adding new technologies can be a complex, risky and expensive process in these circumstances.

As an example of the increase in complexity of services, telecommunications service providers are beginning to shift their focus from simple connectivity to products that add higher-level functionality to the connection, for example by delivering media content using IT platforms and hosted applications. The connectivity products themselves are also in flux, shifting from voice and data services based on conventional telephone networks to high-speed, high-bandwidth wired and wireless/mobile telephony and data services. New complex telecommunications products combining multiple telecommunications services are being devised. The need to manage migration from legacy to next-generation technologies also adds complexity to the maintenance and management of telecommunications products The present invention seeks to alleviate some of these problems.

SUMMARY OF THE INVENTION

Accordingly, in a first aspect of the invention, there is provided a method of processing service information relating to a plurality of user services available in a telecommunications system, comprising: storing, in a service information database, entities defining service components, each service component entity representing a distinct aspect of service functionality providable by the telecommunications system; storing in the database entities defining implementation technologies, each implementation technology entity being associated with a service component entity and representing a technology usable for implementing the aspect of service functionality represented by the service component entity; and storing in the database entities defining user services available to users of the telecommunications system, each user service entity being associated with one or more service component entities defining service functionality aspects of the user service.

This can enable user services (also referred to herein as 'products' as discussed previously) to be defined independently of the technologies used to implement them. Reusable service components can be defined which represent fundamental capabilities of the telecommunications service. The service components can be considered as elementary services which can be combined to form complex services. The separation of the user service or product layer from the technology layer, and introduction of an intermediate service component layer, can have a number of additional advantages. Firstly, user services can be developed rapidly and with low risk, despite potentially increased complexity. This includes maintaining existing user services, as well as adding new ones. Secondly, it can enable user services to be delivered by a range of technologies—for example, by whatever technology meets the service level agreement (SLA) associated with the user service, thereby enabling fuller use of the deployed network assets/resources. Thirdly, new technologies can be introduced into the telecommunications service without disrupting the user service portfolio. Generally, the approach can have benefits for data quality, life-cycle management, optimization and provisioning automation. These and other advantages are discussed in more detail below.

The telecommunications system typically provides telecommunications services. However, other types of services may additionally be provided by or using the telecommunications system, for example data processing, storage, and retrieval services. These kinds of services are also referred to herein as IT services. Specific examples of IT services could, for example, include a mailbox, web space, an interactive travel booking system or an online game.

Instead of a telecommunications system, the invention may also be applied to any suitable type of communications system or information processing system in which services are provided to end users. For example, the invention could be used to model services provided by an application server or a content delivery system.

The term "entities" preferably refers to database entities stored in the database, for example in the form of data structures. Entities may, for example, be stored in tables or groups of tables in a relational database or as objects or groups of objects in an object database. The data structures used to implement-entities will depend on the type of database used. The database may be held at a single location or may be a distributed database.

The distinct aspect of service functionality represented by a service component is preferably a fundamental capability or elementary service provided by the telecommunications system. Thus, service components are preferably chosen to represent simple units of service functionality which can be usefully combined to produce complex services.

The term "implementation technologies" preferably refers to technologies available in a telecommunications system for implementing services and products. These may, for example, be networking technologies for implementing communications-related service aspects, such as ISDN (Integrated Services Digital Network) or ADSL (Asymmetric Digital Subscriber Line), or data storage or processing technologies for implementing IT service aspects, such as data files, databases, application servers or applications. Implementation technologies may comprise hardware (e.g. switches, routers, wired connections, access points, server hardware etc.), software (e.g. protocols, messaging systems, mail server applications etc.), or combinations of the two.

The term 'user service' preferably refers to a service offering, offered to users of the telecommunications system by the service provider. As already mentioned, user services are also referred to herein as telecommunications products, or simply products. A user service or product may (and often does) combine multiple individual services into a single offering, and may combine both communications and IT services. User services or products can typically be ordered, requested or purchased by the user, in response to which services matching those specified in the product are then provisioned by the telecommunications system. Provisioning of a product, service, or functionality is also referred to herein as implementation of the product, service or functionality. Technologies used in the implementation are termed "implementation technologies" as set out above, or "technology options" where multiple alternative technologies may be available to implement the same product, service or functionality. The process of implementing (provisioning) a product or user service is also referred to as fulfillment.

The telecommunications system is preferably associated with a telecommunications network, with implementation technology entities defining networking technologies usable to implement service functionality aspects in the telecommunications network (in particular communications functionality). In addition, implementation technology entities may define IT technologies usable for implementing IT service functionality, such as data storage and processing functionality and the like, provided within or externally of the telecommunications network.

The method preferably comprises associating a given service component entity with a plurality of implementation technology entities representing alternative implementation technologies, each alternative implementation technology being independently usable for implementing the aspect of service functionality represented by the given service component entity. This can allow relationships between user services and implementing technologies to be defined more flexibly.

Preferably, the method further comprises: receiving a service request relating to a user service entity; identifying one or more service component entities associated with the user service entity; and, for the or each identified service component entity, identifying an implementation technology entity associated with the identified service component entity; and implementing the service functionality aspect represented by the service component entity using the implementation technology defined by the identified implementation technology entity. In this way, user services can be implemented in an efficient and structured manner. The method may further comprise accessing one or more implementation rules associated with an identified service component entity (or a group of service component entities), and implementing the corresponding service functionality aspect (or aspects) in accordance with the implementation rule or rules. By associating implementation rules with service components, implementation of complex user services can be simplified, and new user services can be defined without necessarily having to define new provisioning procedures. Implementation rules may, for example, be in the form of instructions, procedures, scripts or the like.

Where a given service component entity is associated with a plurality of alternative implementation technology entities, the method preferably comprises: selecting one of the alternative implementation technology entities in dependence on a predetermined criterion; and implementing the service functionality aspect represented by the given service component entity using the implementation technology specified by the selected implementation technology entity. This can enable different implementation technologies to be used for implementing the same service component depending on circumstances. The method may comprise assigning priority information to the alternative implementation technology entities, the predetermined criterion comprising the priority information. In this way, different technologies can be prioritized so as to enable efficient automatic selection. Alternatively or additionally, the method may comprise storing one or more rules relating to the alternative implementation technology entities, the selecting step comprising evaluating the rule or rules and selecting an implementation technology entity in dependence on the outcome of the evaluation. Rules may allow for more complex selection criteria than priority information alone.

The given service component entity may be associated with a parameter relating to the corresponding service functionality aspect; and at least one of the alternative implementation technology entities associated with the given service component entity may specify a constraint on the parameter defining a condition under which the implementation technology represented by the implementation technology entity is usable to implement the service functionality aspect. The method then preferably comprises selecting one of the alternative implementation technology entities in dependence on the constraint or constraints. This can enable automatic selection of a suitable technology based on its capabilities (as expressed by the parameter constraint).

A constraint is preferably a restriction on the set of all possible values for the parameter (e.g. a subset of the values), though in some cases, the constraint could be a null constraint (i.e. allowing all possible values or imposing no restriction). For example, constraints specified by the alternative implementation technology entities may be (specific) values or value ranges of the parameter. However, constraints need not be absolute but could instead be relative, for example to some other parameter (possibly a parameter of a different service component). As an example, a constraint may specify that the value of one parameter must be the same as that of another parameter.

The method preferably comprises receiving a requirement constraint relating to the parameter and specifying a requirement for the service functionality which is to be implemented, the selecting step comprising comparing the requirement constraint to one or more constraints (preferably to each constraint) specified by the alternative implementation technology entities, and selecting one of the alternative implementation technology entities in dependence on the outcome of the comparison.

This can allow the automatic selection of an appropriate technology suitable for fulfilling a requirement that has been placed on the service which is to be implemented. Parameterization, combined with automatic technology selection, can enhance the flexibility of the service information database and can simplify the definition of products and services as well as the provisioning of services.

The method preferably comprises determining whether the constraint specified by a given implementation technology entity matches the requirement constraint, and selecting the given implementation technology entity in dependence on the outcome of the determination. However, the constraints may be only one of a number of criteria (including, for example, priority information or rules as set out above) used in combination to select an implementation technology; for example, constraints may be used to identify those technologies capable of supporting a service component, and priority information or rules may then be used to further select from those capable technologies. Here, constraints may be considered to "match" if one constraint (in terms of the set of values it restricts the parameter to) contains (is a superset of), falls within (is a subset of) or overlaps (intersects) the other constraint. The exact implementation of the matching comparison may depend on requirements.

As for the constraints specified by implementation technologies, the requirement constraint may be a value or value range of the parameter, or may be any other kind of constraint. In a typical example, implementation technologies may each specify different ranges for a parameter, and the requirement constraint may specify a specific value for the parameter. An implementation technology can then be selected if the specific value of the requirement falls within its defined range (subject to other criteria that may also be considered, e.g. priority information). The requirement constraint may be specified by the service request or the user service entity to which the service request relates.

Preferably, the method comprises defining a set of parameter values that the parameter can take, the set of parameter values being selected to be independent of implementation technologies (so as to produce a technology-independent parameter). The constraint or constraints are preferably expressed in terms of the technology-independent parameter values. This can enable easier comparison between alternative technologies. The method may comprise receiving a technology-independent parameter value specifying a requirement for the service functionality aspect being implemented, and implementing the service functionality aspect may then comprise translating the technology-independent parameter value to a corresponding technology-specific parameter value in accordance with the selected implementation technology. This can enable a provisioning process to operate efficiently despite potential incompatibilities between alternative technologies.

The method may comprise identifying a network location involved in the implementation of the service functionality aspect represented by the given service component entity, receiving information relating to technology resources available at the network location, and selecting one of the alternative implementation technology entities in dependence on the received information (e.g. depending on whether resources matching an implementation technology are available at the location). This can provide further flexibility in selecting suitable implementation technologies. This and the other described selection criteria may be combined in any suitable way.

Preferably, implementing the service functionality aspect comprises identifying one or more technology resources in a communications network associated with the communications service which correspond to the implementation technology specified by the identified or selected implementation technology entity, and implementing the service functionality aspect using the identified resource or resources. The method may further comprise sending activation information to the resource or resources to configure the resource or resources to provide the service functionality aspect.

Preferably, the method further comprises storing an entity defining a family of related user services and specifying a set of service component entities usable for defining user services in the service family, and wherein the service family entity is associated with one or more user service entities representing user services of the service family, each such user service entity being associated with all or a subset of the set of service component entities specified by the service family entity. This can enable better organization of the service information database, and can simplify definition and implementation of user services. The service family entity may further specify one or more of: a constraint on a parameter associated with one of the specified service component entities, a dependency between specified service component entities or between parameters of specified service component entities, and an indication of whether a given specified service component entity represents an optional or non-optional service component of user services in the service family. This can provide increased flexibility.

The method may further comprise organizing service component entities in a hierarchy by defining associations between service component entities. The method may comprise associating a service component entity representing an aspect of service functionality with a plurality of subsidiary service component entities representing constituent elements of that aspect of service functionality. This can again enhance flexibility and simplify provisioning. Provisioning (implementation) of a high-level service component in such a hierarchy is preferably performed by provisioning (implementing) each of its sub-components, typically in a specified or automatically determined order. The order may be selected based on efficiency considerations or interdependencies between sub-components.

The stored service component entities preferably include one or more of: access connection components defining service functionality for accessing a network; network connection components defining service functionality for providing connectivity or capacity within a network; content delivery components defining functionality for data storage, processing and/or transmission; authentication components defining service functionality for user authentication, authorization and/or conditional access; and public label components defining service functionality for identification or labeling of users and/or for providing access to users. Each service component may be associated with one of the above component types. By using these component types, products and services can be more efficiently modeled.

Preferably, the method comprises managing migration from a first technology represented by a first implementation technology entity to a second technology represented by a second implementation technology entity by: identifying a service component entity associated with the first implementation technology entity; and associating the identified service component entity with the second implementation technology entity. Preferably this is carried out for each service component entity associated with the first implementation technology entity. In this way, technology migration can be managed more easily. Implementation technology entities are preferably associated with priority information, the method preferably further comprising assigning a higher priority to the second implementation technology entity than the first implementation technology entity. This can force future provisioning to select the second implementation technology when possible, thus assisting in the phasing out of the first implementation technology. Alternatively, a lower priority could be assigned to the second implementation technology, for example if it is desired to 'use up' existing technology resources before new ones are provisioned. Preferably, the method further comprises disassociating the first implementation technology entity from the identified service component entity and/or deleting the first implementation technology entity. This can prevent the first implementation technology being used in the future.

The method may further comprise: receiving a request specifying an implementation technology; and outputting a report specifying user services represented in the service information database which can be implemented using the implementation technology. This may comprise: identifying an implementation technology entity representing the specified implementation technology; identifying a service component entity associated with the identified implementation technology entity; identifying user service entities associated with the identified service component entity; and outputting the report on the basis of the identified user service entities. This can enable valuable information to be extracted from the database relating to the dependence of user services on given technology. Conversely, the method may also or alternatively include outputting a report identifying the implementation technologies used or usable in implementing a given user service or services.

In a further aspect of the invention, there is provided a method of provisioning services in a telecommunications network, comprising: receiving a service request specifying one of a plurality of user services providable to users of the telecommunications network; accessing service data corresponding to the specified user service in a service information database; retrieving implementation data specifying a plurality of implementation technologies usable for implementing an aspect of the specified user service from the database; selecting one of the implementation technologies specified by the implementation data; and implementing the aspect of the specified user service in the network using the selected implementation technology. The method may further include any of the features of the method aspect set out above, in any appropriate combination.

In a further aspect of the invention, there is provided a method of provisioning services in telecommunications system, comprising: storing, in a service information database, entities defining service components, each service component entity representing a distinct aspect of service functionality providable by the telecommunications system; associating provisioning information with service component entities (preferably with each service component entity); storing in the database entities defining user services available to users of the telecommunications system, each user service entity being associated with one or more service component entities defining service functionality aspects of the user service; receiving a service request relating to a given user service entity; identifying one or more service component entities associated with the given user service entity; and for each identified service component entity, retrieving provisioning information associated with the service component entity and provisioning the service functionality aspect defined by the service component entity in accordance with the retrieved provisioning information.

In a further aspect of the invention, there is provided an electronic service information database for a telecommunications system comprising: entities defining service components, each service component entity representing a distinct aspect of service functionality providable by the telecommunications system; entities defining implementation technologies, each implementation technology entity being associated with a service component entity and representing a technology usable for implementing the aspect of service functionality represented by the service component entity; and entities defining user services available to users of the telecommunications system, each user service entity being associated with one or more service component entities defining service functionality aspects of the user service. The database may comprise any of the features set out in the context of the method aspects described above, in any appropriate combination.

The invention also provides a computer program or computer program product for processing service information relating to a plurality of user services available in a telecommunications system, comprising software code adapted, when executed on a data processing apparatus, to perform a method as described herein; and apparatus for processing service information relating to a plurality of user services available in a telecommunications system, comprising means for performing a method as described herein.

More generally, the invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa.

Any reference to software and hardware features herein should be construed accordingly.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale. Preferred features of the present invention will now be described, purely by way of example, with reference to the accompanying drawings, in which.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure. Reference is now made in detail to the exemplary embodiments of the invention, examples of which are illustrated in the accompanying drawings. Wherever possible, the same reference numbers will be used throughout the drawings to refer to the same or like parts (elements).

The product modeling approach described herein seeks to remove the direct dependency between the telecommunications products provided by a telecommunications service and the technologies used to implement them. The model described therefore-models products and implementation technologies as separate layers, loosely coupling them by way of an intermediate layer, and allowing each layer to be managed and optimized independently. Loose coupling between the layers also adds flexibility in the way technology can be used to support the product portfolio.

The decoupling is based on an understanding of the fundamental capabilities that the telecommunications service provides. These fundamental capabilities are captured as 'Service Components' in the intermediate layer of the model.

An advantage of this layered approach is that it can enable products to be expressed in terms of end-user requirements rather than specific implementation technologies. This shift in focus can also enable deployment and investment strategy to be based around capability delivered to the end-user, and to be less driven by technology requirements. The product modeling approach described can also simplify product life-cycle management and service fulfillment processes.

The product modeling approach will now be described in more detail with reference to FIGS. 1 to 5.

Figure 1:
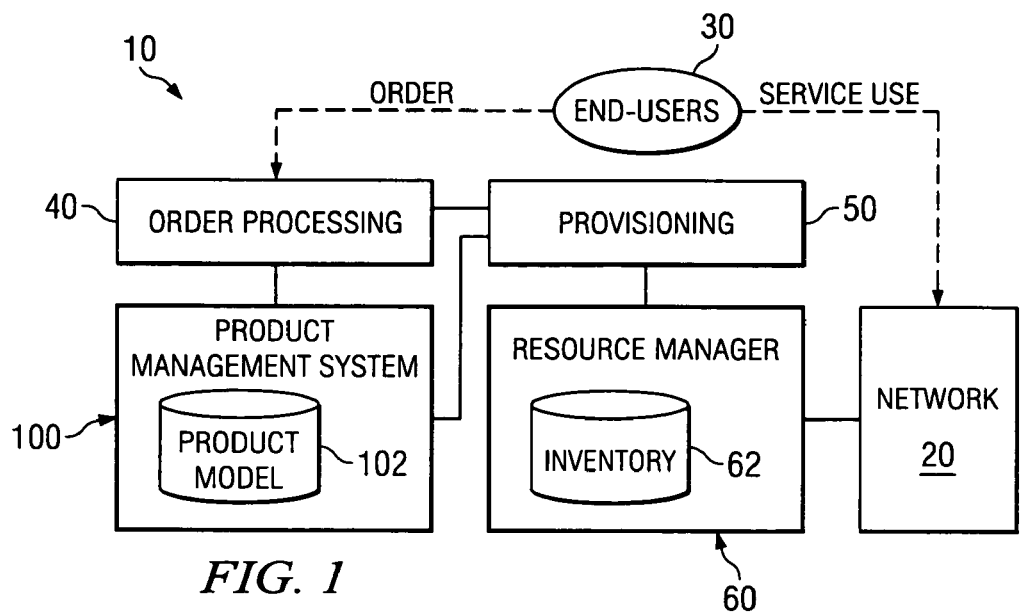
FIG. 1 shows an overview of components of a telecommunications service, including a product management system.

FIG. 1 shows a simplified overview of a telecommunications service 10. Telecommunications service 10 includes a telecommunications network 20 for providing telecommunications services (such as telephony, internet access etc.) to end-users 30. The services provided by the telecommunications service 10 and used by end-users 30 are defined in terms of a set of telecommunications products, which are managed by a product management system 100. Product management system 100 maintains a product model 102 representing available products and technologies used in their implementation as is described in more detail below.

A user can request products by way of product orders using an order processing system 40. The order processing system 40 interacts with the product management system 100 to obtain information relating to an ordered product. The order processing system comprises an order entry process for receiving orders from end-users (for example directly by way of a web interface or through an intermediary such as a salesperson operating an order entry application at a call-centre); and an order fulfillment process for fulfilling a product order by enabling the relevant services in the network 20.

To achieve the latter, order processing system 40 interacts with a provisioning system 50. Provisioning system 50 is responsible for provisioning (that is, delivering) services corresponding to ordered products by retrieving information identifying implementation technologies for use in provisioning the required services from product model 102 and identifying and configuring existing network resources and/or initiating the creation of new network resources in network 20 to support the required services. Changes to network resources, and addition of resources to the network are managed by resource manager 60, which maintains an inventory 62 of the resources available in the network 20.

Once services corresponding to an ordered product have been provisioned and any necessary changes/configuration of the network has been completed, an end-user 30 can then use the services defined by the ordered product in network 20. Products may also include services which are not provided, or not provided wholly, by network 20, in which case the order fulfillment and provisioning processes may interact with other systems to deliver those services as required.

The resource manager 60 and the inventory 62 are also used by other functions within the telecommunications service which are not discussed in detail here and which are not shown in FIG. 1. Examples include network planning and design functions and reporting functions.

Figure 2:
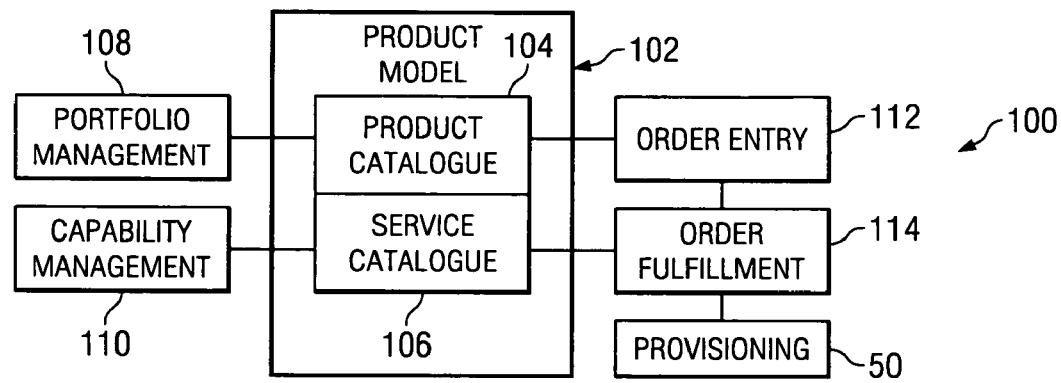
FIG. 2 illustrates the product management system in more detail.

FIG. 2 illustrates the product management system 100 in more detail.

Product management system 100 comprises a product model 102 for modeling the products available to end-users. The product model 102 is made up of two parts: a product catalogue 104 and a service catalogue 106. The product catalogue 104 stores information defining the products which are available to users. The service catalogue 106 stores information defining elementary services that can be provided by the communications network, and the technologies available to implement those elementary services in the network (referred to herein as implementation technologies). Elementary services are distinct aspects of service functionality and represent fundamental capabilities of the communications network. Additionally, the telecommunications service may provide other services which do not use the communications network (or do not use it directly), and these may also be represented as elementary services in the service catalogue, but no implementation technologies are usually defined for such services.

The product model 102 thus distinguishes between the elementary services the network can provide, and the products that are made available to the end user. A portfolio management process 108 allows for addition, modification and deletion of products to and from the product catalogue 104. The portfolio management process may, for example, involve use of an interactive portfolio management application by a human portfolio manager.

A capability management process 110 operates on the service catalogue 106 and allows the elementary services to be specified and the implementation technologies for those elementary services to be defined. This may again be achieved by way of an interactive capability management application.

Definition of the products available to users, and of the technology used to implement those products, is thus separated. The nature of the interaction between these two aspects of the product model 102 is described in greater detail below.

An order entry process 112 receives end-user orders relating to products defined in the product catalogue 104, for example from an interactive order entry application. An order fulfillment process 114 manages the fulfillment of product orders using service provisioning process 50. The provisioning process 50 is responsible for the provisioning of services in the network 20 using information defining elementary services and implementation technologies obtained from service catalogue 106.

Figure 3:
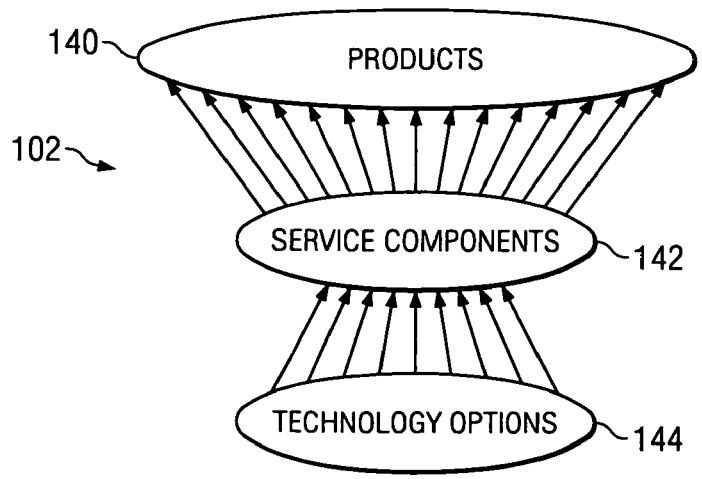
FIG. 3 illustrates a product model used by the product management system.

FIG. 3 illustrates the product model 102 in more detail.

A first layer 140 of the product model 102 stores entities defining Products available to end-users of the telecommunications service. These Products represent complex services and may be grouped into Product Families.

A second layer 142 of the product model stores entities defining the elementary services provided by the network. A Product consists of one or (usually) more such elementary services. Elementary services are thus building blocks or components from which more complex services can be constructed. For this reason, the elementary services will be referred to herein as Service Components.

A third layer 144 stores entities defining implementation technologies. Implementation technologies are technologies usable in implementing given Service Components. As there will often be several alternative technologies available for the implementation of given service components, implementation technologies will also be referred to herein as Technology Options.

The product layer 140 corresponds to the product catalogue 104 of FIG. 2. The Service Component layer 142 and Technology Option layer 144 together correspond to the Service Catalogue 106 of FIG. 2.

The product model defines associations between Products in the product layer 140 and the Service Components from which those products are made up in the service component layer 142, with a given Product consisting of one or more Service Components as already mentioned. The model further defines associations between Service Components in the service component layer 142 and Technology Options in the technology options layer 144. A given Service Component may be associated with one or more Technology Options. When several Technology Options are defined for a given service component, these represent alternative technologies which can be used for implementation of the Service Component.

There are typically a relatively small number of Service Components (say, in the tens), from which a potentially large and frequently changing range of Products (e.g. in the thousands or more) can be constructed. The Service Components, once defined, will typically change only rarely. The available Technology Options will typically change more frequently (and be greater in number, say, in the 100s) than the Service Components, but less frequently than the Products they ultimately implement.

The different layers of the product model will now be described in more detail.

Service Components: Service Components specify the communications capability that is delivered to the end user in terms of content, quality and quantity—the capability that the end user recognizes and is willing to pay for.

Service Components model the fundamental capabilities a telecommunications service provides to end-users. This approach to modeling can help focus the service provider on optimizing these fundamental capabilities, both for the market, in terms of providing new telecommunications products, and by reducing the cost of delivering telecommunications services.

As indicated above, Service Components are typically relatively stable, evolving much more slowly than either Products or Technology Options. This is because it is typically rare for a fundamental new capability to be added to the telecommunications service. However, in recent times, Next-Generation-Networks (NGNs) delivering applications, such as VoIP and IPTV, over data networks, have established IT Applications as a new capability that needs to be managed within telecommunications services. The result can be a significant increase in the number of combinations of components that are now possible, adding complexity to the product management process.

The service component layer in the product model decouples the product definition from the hardware implementation. This decoupling can enable the telecommunications service to exploit any suitable technology (represented by Technology Options) that may be available to deliver a given product order. By having a larger range of implementation options, the time required to provision or repair a service can be shortened. It can also result in an increase in the overall utilization of technology resources. For example, where specialist TDM (Time Division Multiplex) capacity has been exhausted, it is possible to use xDSL technology to deliver nx64 kbit/s leased line products. This is possible because the product definition need not limit the implementation of the product specifically to TDM.

Decoupling of implementation technologies from the definition of products can also simplify migration to new technologies. New technologies can be deployed according to any rollout plan. The order fulfillment process can exploit whatever technology, new or legacy, that may be present at any particular location. Rules can be used to govern selection where there is a choice of technologies and all of this can be transparent to the rollout program.

A good contemporary example is the voice service, which is transitioning from the public switched telephone network (PSTN) to fully digital data networks. The fundamental voice service remains largely the same; it is only the delivery technology that is being transformed. The transformation is typically carried out by the service provider to reduce both operational and capital costs and to establish a platform for next-generation products. Both technologies will nevertheless often need to be managed together, seamlessly, and for residential volumes, for a number of years. The product model described can assist in the transition by allowing the voice service to be defined independently of the technology it is delivered over, with the fulfillment process able to make use of either technology depending on circumstances.

Service Components are usually not used on their own (though in some examples, a very simple telecommunications Product could conceivably consist of only a single Service Component). Typically, Service Components are combined in order to provide a useful capability to the end-user. However, each Service Component will result in a domain-specific service from particular network resources, such as a broadband access network or HLR (Home Location Register). In this way, combinations of Service Components can be used to define complex end-user products that make use of a number of different types of network resources.

As mentioned above, in addition to Service Components which represent functionality provided by network resources, other, non-network services may also be modeled as Service Components. Such services may be managed by a service management layer (SML) in the telecommunications service. SML services are here considered separate from network resource based services and are modeled as separate types of Service Components, effectively resulting in separate SML and resource service component layers. This can allow the fulfillment process to proceed in both layers with a high degree of independence.

Principles for Defining Service Components: Products, and their associated Service Components are not themselves descriptions of network resources, but instead specify requirements that the network resources needs to satisfy. The service components thus typically do not define all the elements of the network that make up a service, but instead only describe service features directly experienced by the end-user.

Aspects that the end-user does not directly experience, such as technology choice and any intermediate capability; core network, server platforms and so on, are determined by provisioning automation when the service is delivered.

The definition of a suitable set of service components is led by the following goals:
  To enable rapid construction and maintenance of Products
  Encapsulation of a range of technologies that provide essentially the same capability
  The ability to combine Service Components in order to specify a complex service The first of the above points means that the Service Components should preferably be reusable and have provisioning behavior that is well understood.

The second point implies that there should preferably be a small number of Service Components, each of which may be implemented using a wide range of technologies.

The third point reinforces the second. There should preferably be only one structure for each distinct capability, so that different instances of that capability can be directly compared and combined. The system preferably provides for parameterization within the structure, to allow the capabilities to be compared on a parameter scale.

Another implication is that each Service Component should preferably be 'orthogonal' to the others. That is, it should be possible to vary the quality and quantity of a component without impacting any other component in the product: there should preferably be no necessary, or inevitable dependencies between Service Components (though a Product may specify dependencies between its components, as part of its definition).

It is generally preferable not to use a large number of different types of Service Components, defined narrowly, up to the point that they can only be supported by one technology. Such an approach could lead to definition of services that do not capture the essential capability in a way that could make sense to an end-user. It can also undermine the ability to combine components to provide services that reuse underlying resources.

The aim is thus to identify a small set of component types that are sufficient to describe a full range of ICT (information and communication technology) products, are generic, do not overlap and are configurable. The components are preferably designed to support capabilities to the end-user as well as those used by the telecommunications service to create internal services.

It is further preferable to distinguish between content, which is generated/consumed by users of the telecommunications service, and the capacity created by the telecommunications service (in the form of network resources) to transport the content. Both can form the basis of services and-products and should preferably be modeled.

The network resources themselves usually do not generate content, but are responsible for its delivery. For example, live delivery is used for:
  Real-time multi-media conversations between end-users
  Broadcast services
  End-user interaction with hosted applications
  The Storage and retrieval delivery is used for:
  Messenger services
  Media-on-demand services
  Identity management, which is associated with the end-user, and also determines how other users have access to the end-user.

Identifying the correct scope and boundaries for each component can help to improve reusability of Service Components.

SLA Metrics and Service Component Parameterization: One potentially effective representation for Service Components follows the approach taken by Service Level Agreement (SLA) management. Here, a service is defined by a set of parameters, or metrics, and an SLA is defined by the agreed limits for those parameters. The Service Level Guarantee (SLG) typically sets limits beyond which the SLA is considered to be violated (and penalty payments are due, for example). This gives a clear motivation to manage the agreed metrics.

If this is the way service features are agreed with an end-user (and subsequent service assurance is performed), the same parameterization is preferably used to define the Products and Service Components. Each type of Service Component preferably represents a distinct and fundamental capability (referred to as a distinct aspect of service functionality, or an elementary service, above), but the capability is further specified by a set of parameters that typically specify quantity and quality of the offering. This allows a small set of Service Components to be used to describe a wide variety of capabilities and allows these to be varied by changing the parameter values. It also helps to more precisely define what the telecommunications service is offering to end-users, independently of how services are actually implemented.

These parameters also provide a link between the description of products in end-user terms, and the specific information required for technical implementation. However, Service Components are explicitly not dependant on the complexity, diversity and specialization found in the technology layer. As such, they can help to hide the complexity of the underlying technology from the telecommunications service, in effect converting technology resources into a commodity that can be optimized separately from other aspects of the telecommunications service.

Five Categories of ICT Service Component: The considerations above can be used to derive a set of categories of Service Components for use in a given setting. By way of example, the following set of five categories of Service Components may be chosen for use in defining media-rich telecommunications services, but other categorizations may be used depending on exact requirements and circumstances:

- Access Connection—a connection into a network—delivers content in and out of the network
- Network Connection—a connection (typically between two points) within a network—can be used in two ways; for creating capacity and for transporting content
- Content Delivery—data storage and data processing functions used to store content and deliver content in and out of applications
- Authentication—authorizes the end-user to use services
- Public Label—controls the access other users have to the end-user These fundamental categories have a rich parameter set, which allows the definition of a wide range of ICT products by various combinations of these components. Components are here broadly classified into those relating to network connections (i.e. components relating directly to network resources) and those relating to higher-level, often software-driven services of the network such as data processing and storage, referred to herein as IT service components (or simply IT components). In the above list, the first two are typically connection components; while the last three may often be IT components (though in some circumstances such aspects could also be part of the connection functionality and not be supplied as separate IT services in the above sense; e.g. a telephone number in a PSTN which in essence fulfils a Public Label function).

Service Component Prototypes: The basic categorization is a compact way of representing Service Components; a small number of categories, each covering a wide range of capability through a number of parameters. This is useful as it allows direct comparison between and combination of different Service Components, but it does not easily convey the purpose of a component within a product. In a preferred embodiment, the basic categories are therefore expanded into a fuller set of Service Components which are specializations of the generic categories, designed to represent specific types of function. These specialized Service Components are referred to herein as service component prototypes.

Taking the Access Connection category defined above as an example, the following are examples of service component prototypes, defined by constraints on their parameters. Only a few parameters (e.g. type of data, bandwidth, variable/constant/unspecified bit rate—VBR/CBR/UBR) are presented for illustration:

- Control channel/Text, <6 kbit/s, UBR
- High quality narrowband data, 2 k-512 kbit/s, CBR
- Voice quality audio, 20 kbit/s VBR (rt—real-time)
- Standard Data/Video telephony, 220 kbit/s VBR (nrt—non real-time)
- Broadcast quality audio, 220 kbit/s VBR (rt) (Composition quality may require higher bandwidth)
- Broadcast quality video, ~4 Mbit/s VBR (rt) (Composition quality may require higher bandwidth)
- High bandwidth, high quality data, 2 to 155 Mbit/s, CBR, synchronous.

Similar specialist capabilities can be defined for the other Service Component categories; by way of example:

- Network Connection prototype—TDM bearer section; 155 Mbit/s to 10 Gbit/s synchronous CBR,
- Content Delivery prototype—Exchange Server; 128 kbit/s, UBR
- Content Delivery prototype—VoIP Manager; 20 kbit/s VBR (rt)
- Authentication prototype—Secure
- Public Label prototype—name alias, Private Some other possible service component prototypes for the Authentication and Label categories are discussed further below.

The above list of service component prototypes is merely exemplary. The actual service components used will depend on specific requirements.

In the above example, Service Components in the Content Delivery category have parameters that specify the type of connection required to support the content.

Service component prototypes preferably hold information that allows prototypes of the same category to be directly compared. This can provide improved flexibility in combining Service Components relating to multiple products ordered by the same user so as to provide merged services, as is discussed in more detail in relation to the use case described below. Connection components can be compared relatively easily using numeric parameters such as bandwidth, but non-numeric parameters, like Class-of-Service (CoS), may need explicit comparator relationships (<, =, > and so on) to be defined. In some cases (for example, IT components) explicit comparator relationships between all of the prototypes of a category may need to be defined.

The relationships are preferably created as part the service component prototype definition. An example of such a relationship is: "videophone session management contains voice telephony session management". This example is discussed further in relation to an exemplary use case below.

Service Components also represent a fundamental unit of service for the purposes of a separate provisioning process (e.g. provisioning process 50 in FIG. 1). To this end, provisioning rules are preferably associated with Service Components (though these may not be part of the model itself but may be stored elsewhere).

As mentioned briefly above, two types of Service Component can be distinguished: those that encapsulate resource utilization (e.g. connection components and IT components as described above), and non-network end-user-facing aspects of a service. These may, for example, include billing, customer care and response times. These aspects are referred to herein as Service Management Layer (SML) functions and may also be modeled as Service Components (to distinguish from the network resource related Service Components, these are referred to herein as SML components).

Another major function of the SML components is to provide non-network user equipment (CPE—Customer Premises Equipment) and client software for CPEs. Such items are often not managed by the telecommunications service provider and may not consume capacity in network resources. As such they are better suited for management in the SML, provisioned, for example, by workflow-based processes in order management systems. They can be inventoried in a network resource model (such as inventory 62 of FIG. 1), or in pure asset management systems. However, the product model is preferably used to drive both the deployment/provisioning of SML service components and of network-resource based Service Components (also referred to simply as Resource Service Components). Since only the Resource Service Components are related to network technologies, only those components are associated in the product model with implementation technologies (in the form of Technology Options).

In contrast to the SML, the Resource Management Layer (RML) consists of the systems and processes used to manage ICT resources (in particular network resources). This typically includes network design/engineering systems, assurance systems, and resource provisioning systems. In a preferred embodiment, resource provisioning is provided in two parts: Domain Managers (DMs) manage the detailed provisioning of services in specific network resources they are responsible for; and Inter Domain Provisioning (IDP) designs and assigns services among DMs. The two combine to enable flexible provisioning of the relevant resources.

The product model can support the provisioning process in all three of these layers: SML, IDP and DM. It can transform provisioning into a data driven function, with control explicit in the model, rather than buried in workflow. Existing workflow based solutions can be highly complex, hard to change and costly to maintain.

Provisioning is discussed in more detail below.

Technology Options: Technologies deployed in the network (and which are potential implementation technologies for new services) are represented as Technology Options in the service catalogue part 106 of the product model 102. Technology Options are preferably defined in terms of the quantity and quality of service the individual technologies are able to provide in implementing Service Components.

Each Technology Option will typically support a single Service Component, providing a range of capability to that component. The Technology Option is represented with similar parameterization to the corresponding Service Component, but rather than stating a requirement, the parameterization of a Technology Option describes the range of capability the technology in question can supply. Expressing capability in this way means that the Technology Option is defined in terms of what it offers to the end-user, which can enable like-for-like comparison across different technologies.

This also means that potential technologies can be directly compared to the service requirements specified by a Product and/or a product order, so simplifying the high-level provisioning process. Where there is a requirement for new network resources to satisfy a product order, the Service Catalogue can be used to select the best delivery technology by direct comparison of the product order to the available Technology Options.

The provisioning process is discussed in greater detail below.

How implementation technologies are represented as Technology Options in the model will depend on the service provider's need to distinguish between different implementation technologies and prioritize one technology over another. As such the definition of Technology Options can be broad or can take into account specific factors, such as the physical bearer (copper, fibre or radio) and the type of network termination equipment/NTE (2 port, 4 port, multi-technology and so on). For example, in MSANs (Multi-Service Access Networks), the edge device technology is capable of delivering several connection technologies (PSTN, ATM, Ethernet, TDM and so on) over more than one physical bearer and possibly with different NTE options. Each one of the resulting combinations could be considered a different Technology Option, depending on the service provider's requirements.

More than one technology may be capable of meeting the requirements for a given Service Component. To address this, each Technology Option also has an associated priority, or ranking. These priorities are used to select one of the available Technology Options. Priorities may be based on a number of factors, such as the cost to purchase, deploy and operate the technology and whether the technology is being withdrawn. Ranking technologies in this way can prevent expensive technologies being used for low value products and can reduce the use of obsolete technologies.

Continuing from the previous example, some examples of Technology Options (with associated Service Components) are:

Access Connection—ADSL; <8 Mbit/s, UBR to CBR
Network Connection—SDH; 2 Mbit to 10 Gbit/s, CBR (synchronous)
Content Delivery 'PictureEdit'; picture editing application, 2 Mbit/s, UBR
Authentication—Secure; Server login, Username, password, biometric reading
Public Label—Private; PSTN, number
Public Label—Public; Web server, URL Products: Products are created by the telecommunications service provider to meet and create end-user demand. Some telecommunications service providers target a wide range of market sectors, which can lead to many thousands of individual Products being offered, many of which will be little more than marketing variants, with specialist packages and variations in billing, SLA (service level agreement) and QoS (quality of service).

The product model described here can enable Products to be defined not by technology, but by fundamental capabilities, as captured in the Service Components. Products can thus be defined in terms of end-user requirements, expressed in a form which is relevant to the end-user—such as the desire to watch a video, leave a voice message or be fed information. This allows the telecommunications service to be closer to the end-user and more capable of exploiting the changing market place. The service provider can focus marketing activities on selling lifestyle, anticipating the desires of the end-user, and offering the kinds of interactivity that end-users are willing to pay for, rather than offering services dictated by available technology. By using the present product modeling approach, available technologies can be viewed as delivery vehicles for services, and focus is shifted from technology to end-user requirements.

Marketing of broadband services is a good example, where terms such as 'Digital Subscriber Line' typically mean little to the end-user. It is preferable to describe the products in terms of end-user experience; e.g. the ability to access media-rich information, without losing the phone or worrying about the bill. Describing products in this technology-neutral way can also enable the service provider to deliver products by a range of alternative technologies. How a network service is delivered, e.g. whether by cable, copper or fibre, ATM, Ethernet, MSANs or DSLAMs, is then an issue for the service provider, and need not concern the end-user.

By using reusable Service Components, whose operational behavior and costs are known, the present product modeling approach can allow the definition of Products to be changed rapidly, cheaply and with a high confidence that they can be operated cost effectively. This added flexibility can allow the service provider to converge on products that better fit the requirements of the end-users.

Referring back to FIG. 2, the portfolio management process 108 generates a set of Products that specify product features for the end-user, as well as the requirements the Products place on network resources. When an end-user orders a Product, the order entry process 112 completes the specification of these requirements, so that the provisioning process 50 is given a precise definition of what it needs to provide. Provisioning is discussed in more detail below.

Products preferably determine both the provisioning of network resources and the management of the Service Level Agreements (SLA), using the product data to drive both functions. When combined with volume forecasts, the product data can also be used to plan resource deployment.

End-User Capabilities: Service Components typically need to be combined to produce useful capabilities for the end-user. This is typically true for connection components that usually specify at least two ends. For example:

Two Access Connection components will produce a leased line

An Access Connection component and a Content Delivery component will produce an ASP (Application Service Provider) capability (Internet Access being a simple example)

IT components can often provide useful capability to the end-user on their own. This is the case where a connection does not need to be specified in the product, typically because the service can be accessed through the Internet or through another carrier.

Note that the product usually only specifies those components that directly affect the end-user experience. Intermediate components may be required to construct a complete service, but the provisioning process is free to define such components, usually with the goal of producing the least-cost service that satisfies the SLA. This solution can give more flexibility to the service provisioning process; choosing the technology, media and intermediate locations, while delivering agreed end-user experience and the SLA.

Service Components specified by the provisioning process are otherwise the same as those explicit in the product definition. One example of a type of service component that may be used as an intermediate component is the Network Connection component. For example, leased-line products may define the Access Connection component at each end, but may not specify the interconnection between them. The provisioning process will define a Network Connection component to complete the service. If different technologies are selected at each end, two Network Connections may be required, terminating at some intermediate point in the network, chosen by the provisioning process, where the transition between the technologies can be made.

However, in other examples, for example in products aimed at service providers, Network Connection components may be explicitly specified in the product.

As the above illustrates, Service Components can be combined to provide distinct capabilities which are meaningful and useful to the end-user. These are not necessarily fully-formed products, but can be combined into such products. To enable such capabilities to be modeled, the product model preferably allows Service Components to be organized hierarchically.

In a hierarchy of Service Components, a higher-level component is made up of lower-level components in much the same way as a Product is made up of Service Components. Specifically, a higher-level component specifies a set of lower-level components which combine to form the higher-level component (i.e. the lower-level components represent service functionality which, when combined, yield the service functionality represented by the higher-level component). Correspondingly, provisioning of a higher-level Service Component involves provisioning of each of its constituent lower-level components.

The distinct capabilities referred to above can then be modeled as higher-level components (typically top-level components) in a component hierarchy. This can simplify product modeling by hiding complexity and provide improved flexibility.

Each distinct end-user capability, with a predefined combination of Service Components, preferably also has associated with it a predefined high-level provisioning process in the IDP provisioning layer (described in more detail below). This determines how the given combination of components is provisioned into an end-to-end service. It is where much of the provisioning complexity is typically found, but with the correct choice and structuring of Service Components, this complexity can be systematically addressed by automation.

The fact that there are often not many truly distinct end-user service scenarios at the network resource level, means that there are usually only-a few such end-user capabilities that the provisioning system needs to model. The following are four examples that cover a wide range of possible services:

End-user connection to other end-user locations (leased line and VPN)

End-user connection to a telephony, or IT platform (including broadcast)

Network capacity for other service providers

Internal infrastructure capacity

The present product modeling approach thus also has benefits in the automation of the provisioning process. By defining fundamental capabilities as universal Service Components, the high level provisioning processes can also become universal, built into the core provisioning system and eliminating the need for custom processes and code for each new product launch. This is enabled by the correct componentization of the product model, as captured in the Service Components.

Figure 4:
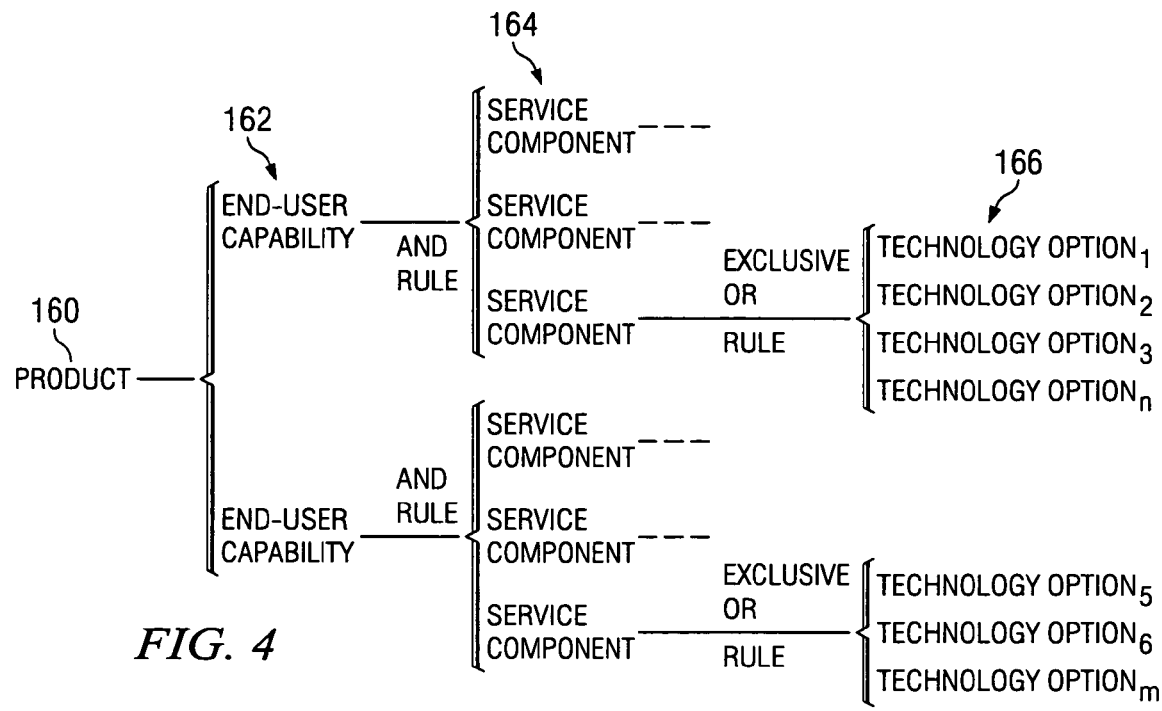
FIG. 4 illustrates how the product model is used to model a product.

FIG. 4 illustrates use of the product model to model a given product.

In the example, Product 160 consists of two distinct end-user capabilities 162. These may be modeled as high-level Service Components as discussed above. Each end-user capability consists of a set of Service Components 164 (as indicated by the 'and' relationship). Each Service Component 164 is in turn associated with a number of Technology Options 166. However, the Technology Options 166 for a given Service Component 164 specify alternative implementation technologies, as indicated by the 'exclusive or' relationship.

Product Families: To enable further organization of the product catalogue, in preferred embodiments, the product model allows groups of related Products to be modeled as Product Families.

In this extension of the basic model, a Product Family models the overall nature of a product, by defining the end-user capabilities that are used to construct it. The end-user capabilities are expressed in terms of Service Components (such as the service component prototypes set out above), which indicate the services that products of the family can provide. The Product Family can also capture any dependencies between the different Service Components and their parameters. For example, a "Hosted Application" product may need to match the bandwidth and CoS (Class-of-Service) of the Access and Content Delivery components. In effect, the Content Delivery component establishes the connection quality and size required to deliver its content. This dependency is captured in the Product Family.

The Product Family is then sub-classified into individual Products. This is achieved by:

Further specifying values, or narrowing the range of the Service Component parameters Omitting Service Components that are optional within the family For example, a given Product Family may provide "Gold", "Silver" and "Bronze" variants. The Gold Product within the family might specify a higher bandwidth for the Connection component, a more secure form of authentication, higher availability and a license for the 'feature-rich' version of the application, as compared to the Silver variant. The Bronze version may not include a broadband connection, but rely on Internet access through another ISP (Internet Service Provider). The result would be a version of the product that could not be quality assured, but would otherwise remain fully functional. It would also mean that the service could be used from any location with Internet access.

The Use Case described below provides a more detailed example of Product Families.

Portfolio and Capability Management: As described above with reference to FIG. 2, the product model 102 is maintained in two distinct layers. The first, the product catalogue 104, represents the product portfolio as presented to the end-user; the second, the service catalogue 106, represents the network resource capabilities as delivered by technology. The two layers are preferably managed by two separate processes: portfolio management process 108, which includes the definition, modification and deletion of Products and Product families in the model, and resource capability management process 110, which includes the definition, modification and deletion of Service Components and Technology Options. These processes will now be described in more detail.

Portfolio Management: The portfolio management process 108 allows Products available to the end-user to be created, edited and maintained. The Products are defined in terms of the set of reusable capabilities represented by the Service Components.

Changes to the product catalogue 104 are typically frequent, resulting in many minor variants of products aimed at a broad and complex market place. However, much of the variation can often be superficial as far as the provisioning processes are concerned, so by properly encapsulating the Service Components and dividing them cleanly between SML and resource layers, it is possible to add new products by mixing and matching existing components.

In this way, it is possible to provide a flexible product portfolio which is adaptable to changing end-user requirements, whilst giving a high degree of confidence that the resulting products can be operated and delivered efficiently. For example, a broadband Internet access Product, aimed at the business market, can reuse Service Components from a corresponding residential broadband Product, but can enhance the Product offering with higher quality and quantity and additional content. The higher-level provisioning process, based on the underlying combinations of Service Components, can remain the same for both.

The Product Catalogue 104 is the data structure that results from the portfolio management process. It describes Products in terms of both SML and resource capabilities, so should be seen as extending across both layers.

Resource Capability Management: The service catalogue 106 captures the relationship between a Service Component and the technologies that can be used to implement it (the Technology Options). The service catalogue is maintained by capability management process 110. This process classifies each new Technology Option by the Service Component it implements and the ranges within the Service Component parameterization that it can support. The process also maintains the priority assignments of different Technology Options.

The service catalogue will typically change less frequently than the product catalogue, the rate of change being governed for the most part by the rate at which the underlying technologies change. The service catalogue is updated to reflect the introduction, withdrawal or modification of technologies used in the telecommunications network.

Capability management takes place independently of the fulfillment process. This means that new technologies can be added without disrupting existing technologies, products or processes. They can be added to either improve QoS, or reduce the cost of supplying existing products; quite possibly both. This can be done without the cost, or disruption to the market of a new product launch (though the new technology may also enable new products).

Old technologies can be withdrawn with similar seamlessness. To implement withdrawal, a technology can be reduced in priority in the service catalogue, so that it is only used when there is no other option, or it can be removed completely, so no further services are provisioned using it.

This can provide a powerful mechanism for managed migration from legacy technologies. External network planning/design/engineering processes can add or replace technologies without regard to the fulfillment process, which will continue independently, utilizing whatever technology is available at a given time and location, according to their associated priorities. Usually, all that is required is that the service catalogue and fulfillment systems are properly updated with data describing the technology change.

However, it may often be important to fully understand the impact on the product portfolio of withdrawing a technology. This is discussed next.

Technology to Product Traceability: The product model enables useful reporting functions which allow the use of technology to be traced. The product model (using both the product catalogue and service catalogue) can be used to identify:

technologies required to support a given product products supported by a given technology The first is achieved by tracing through the product model from a given Product, through its Service Components and onto the Technology Options associated with the Service Components. These Technology Options then identify the technologies that are capable of supporting the Product. A potential complication is that there may be multiple Technology Options for each Product, so the reporting function preferably identifies all available Technology Options and their ranking in order to fully identify a Product's dependency on technology.

The second is potentially a more complex search process; although each Technology Option will typically appear against only one Service Component in the service catalogue, the Service Component will often be referenced many times in the product catalogue, because Service Components are the basic building blocks of the Products. The search therefore identifies all products associated with the Service Component (and hence Technology Option). As a result, there may be a large number of products supported by a given Technology Option.

The above analysis can be used to determine the impact on the product portfolio of the withdrawal of an obsolete technology.

However, since a product may have alternative technologies as Technology Options, the product may not be uniquely dependent on one particular technology. It can therefore be insufficient to list the Products supported by a given Technology Option. The reporting function therefore preferably also determines:

- Whether the Product can also be supported by other Technology Options. The reporting function preferably identifies Products that are uniquely dependent on a given technology. This could be where the telecommunication service has a single supplier policy or where a Product has been designed to exploit unique features provided by specific equipment.
- Whether those other Technology Options have a higher or lower ranking. A capable alternative technology may not be a realistic alternative, if it has a much lower priority. For example, TDM leased line technology would typically not be used for residential broadband services.
- What the deployment levels of the other Technology Options are. Other technologies may not be sufficiently well deployed to provide a viable alternative.

As an example of the latter, the product model can determine all the products that are supported by DSLAM technology (Digital Subscriber Line Access Multiplexer). In addition, it can state that all of these products can also be supported by MSAN technology. However, this does not mean that the DSLAMs can be immediately withdrawn, because information describing deployment levels of the technologies may show that the network coverage of MSANs is 4%, while the DSLAMs cover 92% of the network, so the products are, in effect, dependent on the DSLAMs.

The deployment levels can be found from a resource inventory (e.g. inventory 62, FIG. 1) or management model maintained by a provisioning process (see management model 382, FIG. 6, described in more detail below), which is analyzed to determine the proportion of network locations where a technology is present. Additional GIS analysis will give the network distribution of the technology.

Such information is used to further refine the impact of withdrawing a technology from the network.

Figure 5:
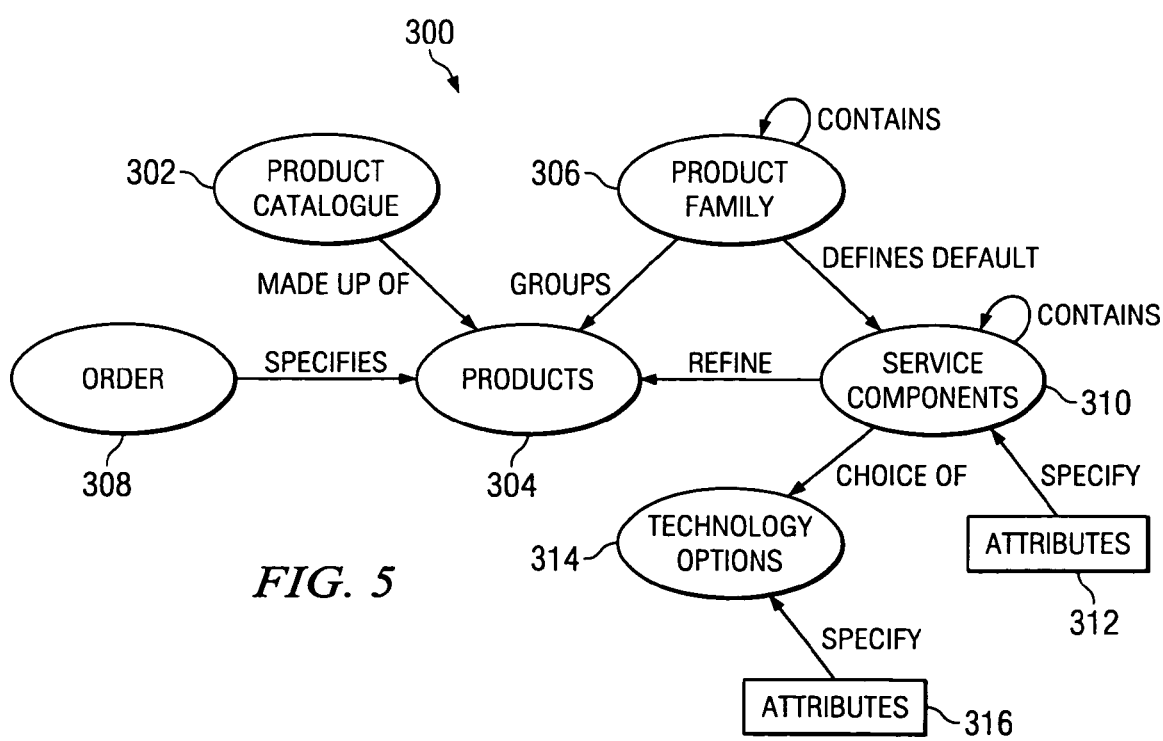
FIG. 5 shows a simplified example of a data model for use in implementing the product model.

Implementation of the Product Model: FIG. 5 shows an example of a data model for representing the concepts discussed above. The data model is typically implemented as a database. FIG. 5 is in the form of a simplified entity-relationship diagram, in which shapes represent entities in the database, and arrows represent relationships between the entities. The arrows are labeled with a short description of the nature of the relationship. The database may be a relational database (with entities represented as tables), object database (with entities represented as objects) or any other suitable type of database/representation.

The product catalogue itself is represented by a product catalogue entity 302. This can allow multiple product catalogues to be managed in the database simultaneously.

Product catalogue 302 is made up of a number of products 304. As already described, products 304 specify products in terms of a number of capabilities which are meaningful to the end-user rather than in terms of implementing technologies.

Product families 306 group products 304 into families. Product families may be arranged hierarchically, with a product family containing other product families, as defined by the "contains" relationship. Each product family 306 also defines the default set of service components 310 for the product family.

Service components 310 refine the products 304 (by defining the individual service functionality aspects or elementary services which make up the products). Service components can also be organized hierarchically as defined by the "contains" relationship. For example, a top level of the service component hierarchy may be used to represent distinct capabilities which are meaningful to end-users and which can be combined into products, with lower levels of the hierarchy specifying the composition of those capabilities from individual elementary service functions. Attributes 312 specify parameters of the service components 310.

Each service component 310 has associated with it a choice of (one or more) technology options 314 for implementation of the service component (though note that non-resource service components such as SML service components may not have associated technology options as described above). Technology options 314 are again associated with attributes 316 which specify parameters of the technology options.

The above describes a simplified data model for implementing the product model 102 (FIG. 2) previously described, including the product catalogue 104 and service catalogue 106. During use of the product model to process end-user orders relating to specific products, further information may be generated.

Specifically, an order 308 may specify one or more products 304. The order data is typically generated by an order entry system (e.g. order entry process 112). Fulfillment of an order leads to the creation of instance data (not shown) based on the information stored in the product model. This, for example, includes service component instances corresponding to service components 310 but which represent actual services and resources which are to be provisioned in response to the order. This instance data is then used by the provisioning process to provision services corresponding to the order, for example by reserving resources and configuring network equipment, and hence fulfill the order. Service components may be associated with provisioning rules for use by the provisioning process.

In some embodiments, the Service Components and associated provisioning rules are generic and predefined, and the remaining elements are defined by the telecommunications service provider based on their specific requirements.

Interoperability: The product model functionality described can be integrated with existing product management systems. Some such tools provide a generic, hierarchical catalogue, with the emphasis on the business process used to manage the product lifecycle (launch, maintain and withdraw).

Such capability is rarely used in telecommunications services, partly because telecommunications products have often been tied closely to individual technologies, in some cases simplifying their definition, if not their provisioning. Standard product management tools can be used to document the business process for product lifecycle management and to capture the processes as workflow. The product catalogues of such systems can be used in a relatively light way, to key into the more detailed product model described here, where the full complexity of the telecommunications product is captured and maintained.

Product Fulfillment and Service Provisioning: The fulfillment process used for provisioning services corresponding to ordered products will now be described with reference to FIG. 6.

The fulfillment process converts a product definition of an ordered product into an actual service (a service instance) deployed to a particular end-user and consuming specific resources (resource instances), a process also referred to as service provisioning. There is typically a direct relationship between the service and the resources it consumes, often described as the 'service topology', though for connectionless technologies, the relationship may be statistical.

The modeling approach described herein can enable the definition of sophisticated product models, but can also in some circumstances require additional provisioning automation to re-connect the product and technology layers. This additional provisioning functionality is here provided by a provisioning layer referred to as the 'Inter-Domain Provisioning' (IDP) layer. The IDP layer bridges the SML (Service Management Layer) and the domain managers (DM) responsible for provisioning individual resources.

As has been described above, SML aspects and network resource-based aspects of services are modeled as separate types of Service Components—here referred to as SML Service Components on the one hand and Resource Service Components on the other. Thus, the Service Component layer of the product model can be seen as comprising separate SML Component and Resource Service Component layers. This means that it is possible to initiate provisioning in both the SML and Resource Component layers simultaneously. However, provisioning of the SML Component layer will usually only complete once the Resource Component layer provisioning has updated the necessary status information and records.

Figure 6:
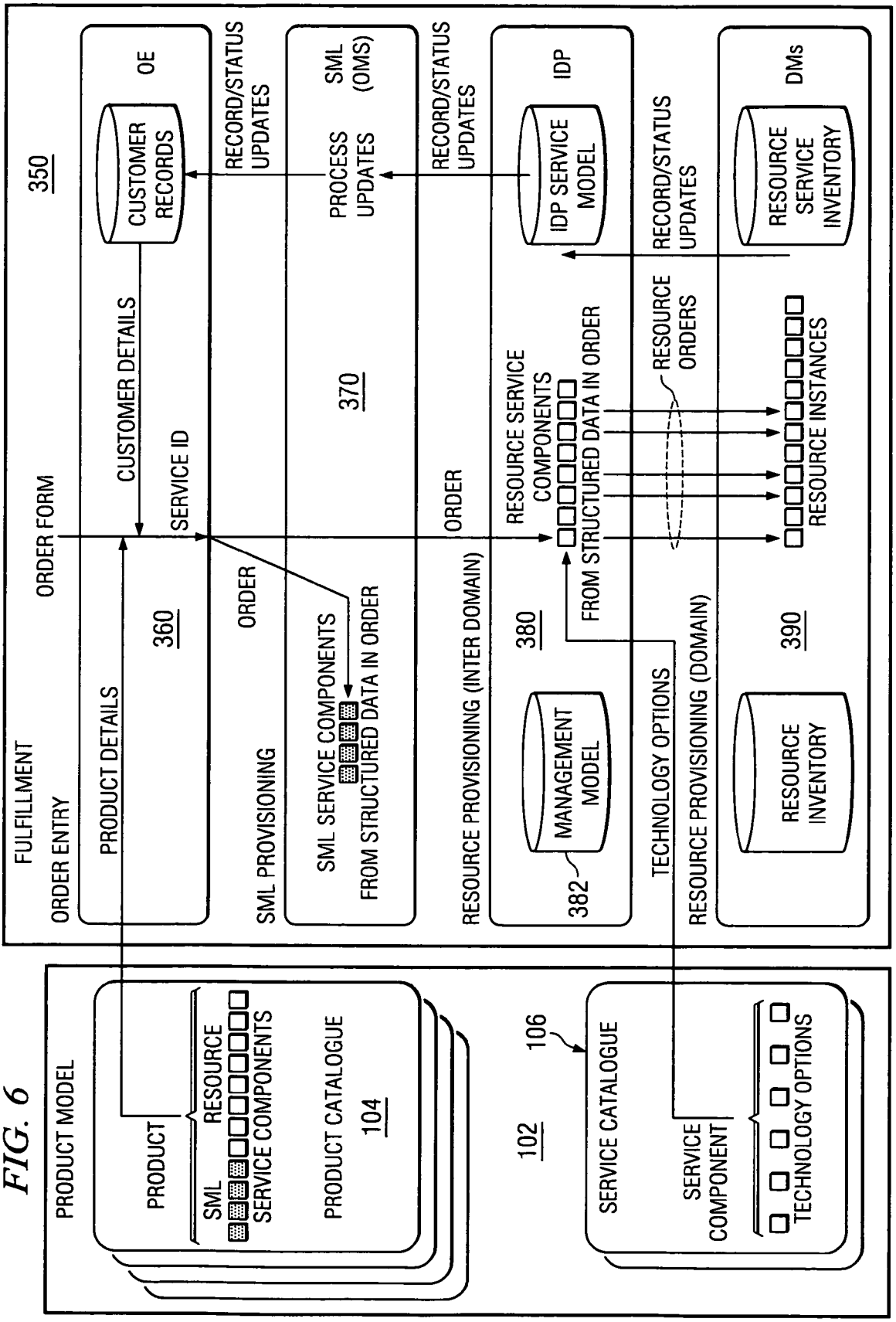
FIG. 6 illustrates the interaction between the product model and a fulfillment/provisioning process.

FIG. 6 illustrates the fulfillment process 350 and its relationship to the product model 102. The fulfillment process has the following layers or stages:

Order entry 360: Here, an order is received from an end-user relating to a given product. Details of the product are obtained from the product catalogue 104 in product model 102. User details are obtained from stored user service records. A unique service ID is generated to identify the specific service instance being provisioned in response to the order. The Service Components corresponding to the ordered product are identified (both SML and Resource Service Components).

SML provisioning 370: The SML service components are provisioned by interaction with the relevant service management systems.

Resource provisioning (Inter-Domain) 380: The Resource Service Components are provisioned in two stages. If a hierarchy of Service Components is used in the model, then the inter-domain provisioning stage 380 (IDP) decomposes the high-level Service Components (or end-user capabilities) into their constituent Service Components. IDP 380 then identifies the Technology Options available for implementation of individual Service Components using service catalogue 106 in product model 102 and selects a Technology Option for each service component based on factors such as priorities assigned to the Technology Options and information from a management model 382 (e.g. coverage information). The IDP layer 380 then issues technology-specific provisioning orders to the domain managers of relevant technology domains as identified by the selected Technology Options. Additionally, IDP layer 380 performs the following functions:

coordinating the overall implementation across the domain managers maintaining an inter-domain service model of the provisioned components (instance data)

issuing orders to connect the components to produce an end-to-end service maintaining status and record updates with the SML and order entry layers IDP uses rules that determine the provisioning of each distinct end-user capability (or high-level Service Component) to design the service (see above). It achieves this by taking input from the service catalogue 106 and the requirements in the order and processing them against its own management model 382 of the network resources. This has the effect of translating technology-neutral service orders into domain specific resource orders. These are issued to individual domain managers 390, which implement the service within their own domains and return the end-points to IDP. IDP may need to issue further orders to connect the components.

IDP also determines how subsequent services can be combined, or merged, using existing resources as end-users order further products. This uses information held in the service components and may result in new services that are implemented in existing, possibly enhanced, resource instances.

Resource Provisioning (Domain) 390: This is the second stage in the provisioning of Resource Service Components. The domain managers receive instructions for the provisioning of specific resource instances from IDP layer 380 and perform the relevant technology-specific provisioning steps, which may include sending activation information to network resources to configure the resources for the service.

Technology Selection: The IDP process described above involves a technology selection step when new network resources are required. This uses the ranked/prioritized Technology Options list in the service catalogue 106 to determine the optimum resource for a given location in the network.

The fulfillment process attempts to match the requirements contained in an order for a product (and possibly in the product itself), which are expressed as values for the parameters of the Service Components, to the capability offered by each technology. The highest priority technology whose capability (specified in terms of the parameters) matches the requirements specified in the order and which is available at the relevant location, will be chosen to provide the service. The availability information is present in IDP's management model 382, which lists all the Technology Options present at each location in the network.

The optimum technology for a service solution will depend on a number of factors. The decision process is outlined below:

Firstly, for an end-user service, can existing resources support the order?

If not, what is the highest ranked Technology Option in the Service Catalogue capable of supporting the order?

Is the technology available at the relevant location?

If not, check for the next highest ranked Technology Option. Continue until a suitable candidate is found.

If no suitable Technology Option exists, offer back a lower QoS (Quality-of-Service) option.

Figure 7:
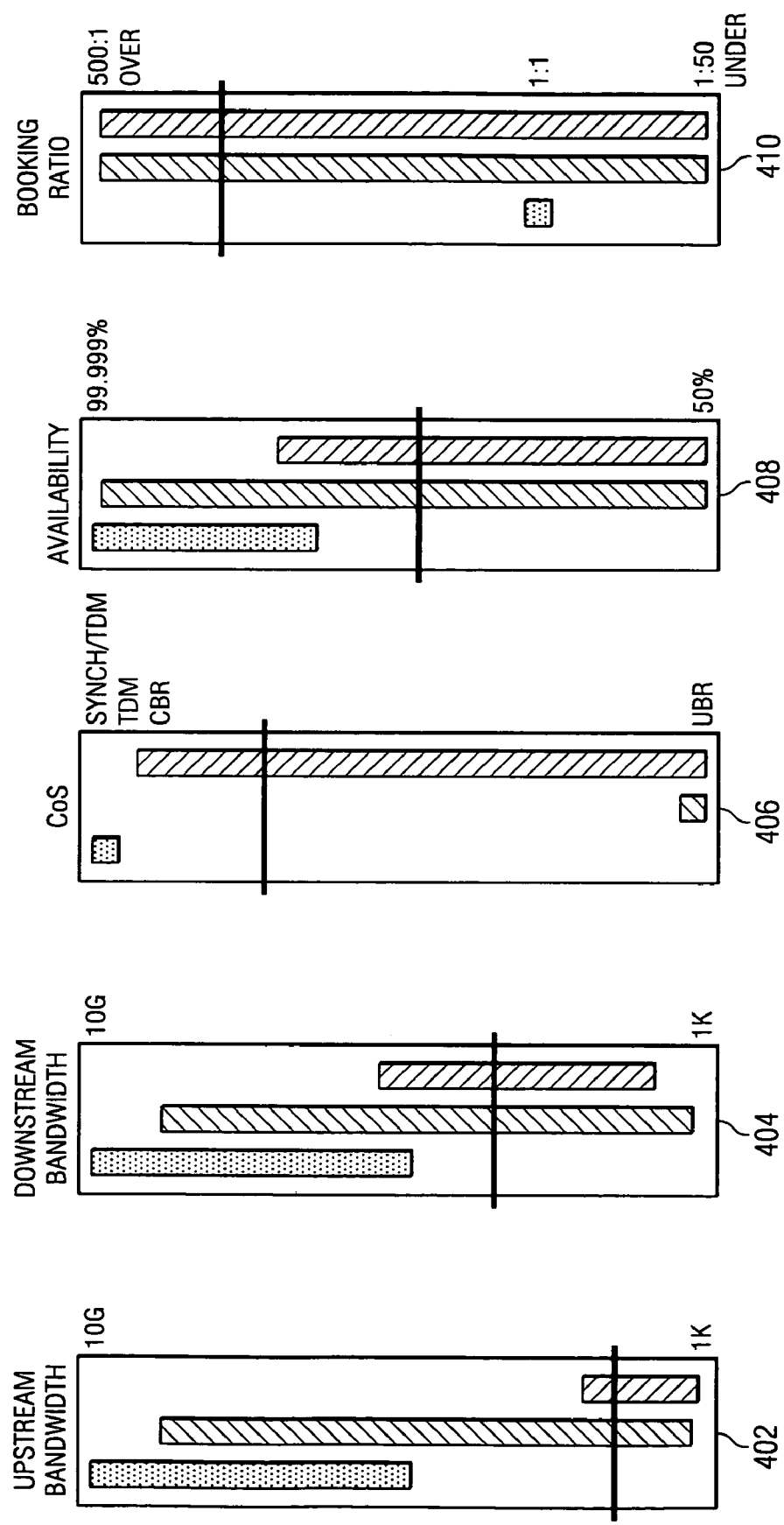
FIG. 7 illustrates a selection process for selecting between alternative implementation technologies.

FIG. 7 illustrates the technology selection step further by showing the relationship between:

A Service Component, with five parameters represented by boxes 402, 404, 406, 408 and 410

Technology Options that are available for implementing the Service Component, each Technology Option specifying a range of values for each parameter over which the Technology Option is usable to implement the Service Component. Three technology options 412, 414, 416 are shown, with supported parameter ranges shown as vertical bars inside boxes 402-410 representing the parameters An order for a Product that selects specific values for each parameter, shown as horizontal lines 420 across the boxes 402-410 representing the parameters.

A suitable Technology Option can be identified by direct comparison of the parameter values of the order to the parameter ranges specified by the Technology Options for each of the parameters 402-410. For example, in the present example, for each of parameters "Upstream Bandwidth" 402, "Downstream Bandwidth" 404, "Availability" 408 and "Booking Ratio" 410, the second and third shown Technology Options ("Ethernet Technology" 414 and "Broadband Technology" 416) both meet the order requirement (because the range specified by the Technology Option overlaps the specific value specified by the order, as represented by the horizontal bar), whilst the first-shown technology option ("TDM Technology" 412) does not. However, for the "CoS" (Class of Service) parameter 406, only the third Technology Option (416) meets the order's requirement, and—being the only Technology Option which meets all of the parameter requirements—is therefore selected. As this example illustrates, instead of continuous numerical parameters, discrete-valued parameters may also be used, and instead of a numerical range, the Technology Options may specify some other constraint on the parameter (for example a specific value or selection of values). In some circumstances, instead of a specific value, the order itself could specify a range or other constraint, and the comparison step would then check whether the range or other constraint specified by the Technology Option contains (or alternatively overlaps with) the corresponding constraint specified by the order.

Sharing and Personalizing Capabilities: The provisioning process can be adapted to deal with the situation where the same resource is shared by a number of services. Sharing is a feature of connectionless data services but also applies to the IT; Content Delivery, Authentication and Label components.

Sharing Connection component resources between different services is a way to deliver value-added services rapidly and with minimum additional cost. However, there may be an impact on performance.

However for IT components, sharing becomes a valuable feature in itself. The same Labels, Authentication and Content Delivery components, such as address books and messaging, can be used in common across a number of services. These value-add components become of real use to the end-user when they are independent of the connection mechanism, be it fixed wire, Internet, mobile or radio. Microsoft Passport™ is an example of a reusable Authorization service.

The opposite is also true. A primary user may add subordinate users to their service and replicate IT components for each. An example would be a parent adding children as independent users. Additional, personalized capabilities can be ordered to enable the children to have their own address books and Label services with associated ring tones and pseudonyms.

Reusing Access Resources: There is a subtlety in the reuse of access resources (i.e. resources relating to Access components). All the layers of the capacity terminate on a single end-user site, so each layer is capable of reuse for the end-user. However, the levels of complexity, manual intervention and cost increase with depth:

Resource Instance—represents managed capacity assigned to the end-user by the fulfillment process to support one or more services. It sits within a technology bearer. Resource Instances can be used for a number of services if they share the same CoS and destination. However the resulting services can only be guaranteed to be simultaneously usable if the Resource Instance is enhanced to support the sum of the requirements, rather than just the maximal value.

Technology bearer—ATM (DSLAM), Ethernet (MSAN), SONET/SDH and so on, deployed over the physical network as a result of service orders to provide capacity for Resource Instances. The technology bearer may support a number of Resource Instances through the access network, carrying connections of different CoS, with different destinations, or for different services. It should be noted that it is typically the Resource Instance that represents the content managed through the network. The capacity provided by the technology bearer will only be exploited to the extent that it is consumed by Resource Instances. Current products usually leave capacity unused in the access to each end-user. The unused capacity can be used to provide additional or enhanced services.

Physical bearer—copper, fibre, cable, radio and so on, deployed to enable the end-user location for services. Multi-service edge devices can allow a single physical bearer to deliver multiple technologies to the end-user. For example ADSL (Asymmetric Digital Subscriber Line) can deliver PSTN (Public Switched Telephone Network) plus ATM (Asynchronous Transfer Mode); and PON (Passive Optical Network) can deliver data plus broadcast video. More typically, a physical bearer will deliver a single technology, which becomes the technology bearer. If the physical bearer exhausts, there are options to deploy multiple physical bearers or a higher bandwidth physical medium, such as fibre. This will often be a manual planning decision, based on local conditions.

Figure 8:
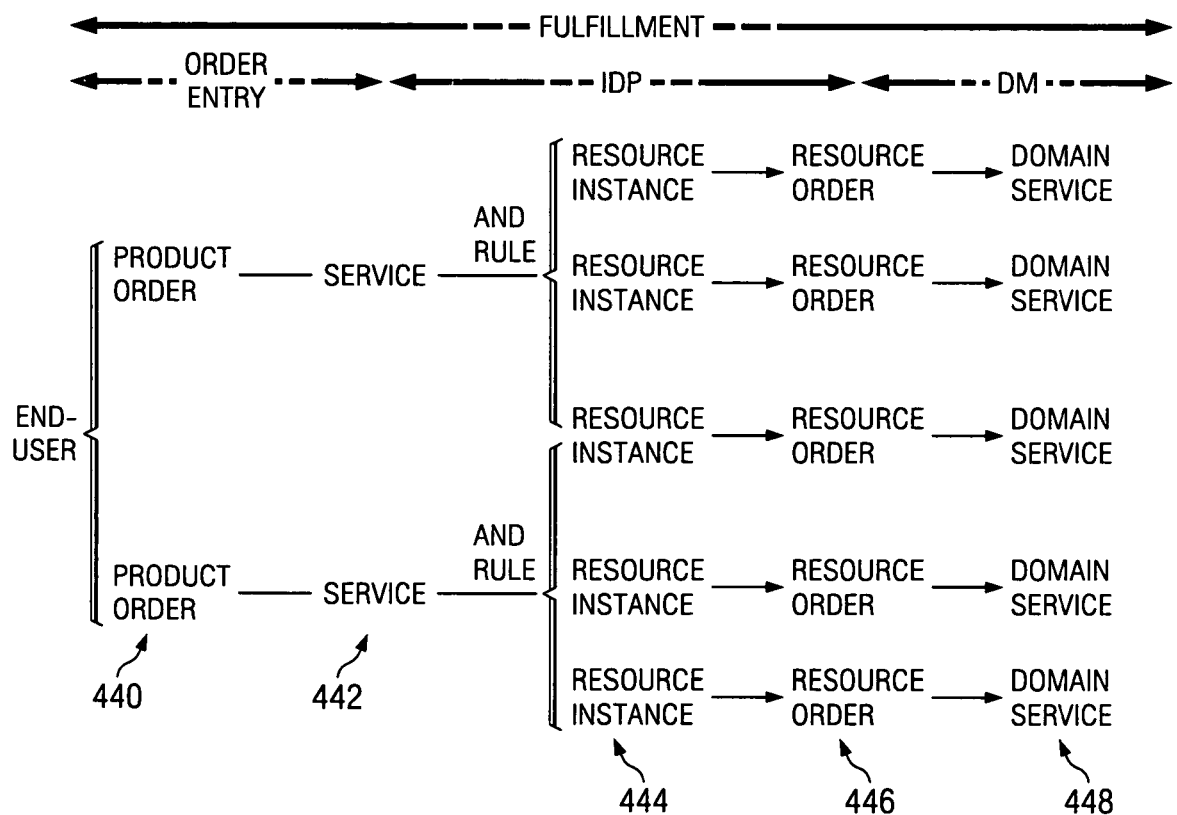
FIG. 8 illustrates instance data generated by the fulfillment/provisioning process.

Instance Data: FIG. 8 shows an example of instance data created as a result of the fulfillment process acting on the product model in response to product orders.

Product orders 440 relating to a given end-user are implemented as Services 442. Services are specific instances of the products defined in the product model. Each Service 442 is implemented by a number of Resource Instances 444. A Resource Instance 444 typically corresponds to (or is an instance of) a Service Component in the product model, as implemented by a given selected Technology Option. As shown, a Resource Instance can be shared by more than one Service 442. Resource Instances 444 are translated into Resource Orders 446 which are passed to the domain managers (DMs) of the selected technologies to generate Domain Services 448.

Parameterization of Technology Options: As already described above, it is desirable to be able to compare Service Components and Technology Options on the basis of a range of parameters. These parameters are not necessarily numerical and so simple numerical comparisons are not always possible. Furthermore, Service Components are typically not technology-specific and so should be defined with parameters that, themselves, are not technology-specific. To enable meaningful comparisons to be made, the product model therefore preferably defines generic service parameters that can be used to identify equivalent capabilities in different technologies and allow like-for-like comparison.

Class-of-Service (CoS) and Security Parameters: Currently there is no pan-technology standard for CoS. Each technology tends to create its own standard and this could hinder the creation of a technology-independent product model. What is more, a generic CoS setting will need significant interpretation to be applicable to specific technologies, such as MPLS (Multi-Protocol Label Switching) and ATM (Asynchronous Transfer Mode). Bandwidth has a different interpretation in CBR services such as TDM, where it is defined precisely, as compared to data services where it is defined statistically.

Given a standard, generic set of CoS values, it is usually not feasible to send an order to a technology specific domain manager using technology neutral parameters. A translation step is therefore provided, preferably as part of the interface between IDP 380 and the DMs 390 (FIG. 6).

Overall, there are two requirements.

Firstly, there is a need for a small set of generic CoS settings that fully describe the different types of data pipe required to optimally capacity manage media-rich networks.

Secondly, there is a need to standardize the way each technology translates against the generic metrics, so as to describe their capability in a directly comparable manner.

As for other aspects of the product model, a preferred solution to these problems lies in defining service capabilities in terms of end-user experience. From the end-user's viewpoint, different services typically relate to the delivery of different forms of multimedia and specialist data, in the most effective way, and a suitable generic CoS classification scheme is preferably designed to reflect this. To this end, the ATM CoS definitions (e.g. UBR, VBR and so on) can be useful. They make use of a small set of standard values that are well suited to defining multimedia data streams. For other technologies, such as IP (Internet Protocol) and MPLS, determining a suitable mapping can be a more complex task, but it is generally still possible to map these into a similarly small, manageable set of CoS classifications.

Using such a generic classification, it becomes possible to represent product capability not only in a technology-independent manner, but also in a way that allows the services provided by different telecommunications services to be directly compared.

It can also enable the CoS behavior to be maintained when implementation of a service transitions between different technologies in the network, such as between ATM and MPLS networks.

Security settings are another area where standardization of classification schemes can be advantageous. Like CoS, the aim is to produce a defined set of technology-independent security levels that can be translated to any individual technology used to implement them.

The following is an example of a possible generic security classification scheme which could be used by the product model:

Level 0—Public Access (anonymous)
Level 1—Public, Registered Access
Level 2—Personal (address is not public)
Level 3—Private (additional secured access)
Level 4—Secure (additional security measures such as encryption)
Level 5—Sensitive (not networked)

Parameters based on this classification could be provided in both the Authentication and the Public Label Service Components mentioned above.

A security level is preferably specified in the Public Label component because the Public Label component not only defines an address to the end-user's service, for other callers to use, but also restricts callers to predefined user groups within the end-user's centrally managed Address Book. In this example, a Label with Public Access security may be open to anyone who finds the openly published label. Higher levels of Label security may then, for example, require callers to be in a valid user group in the address book and to authenticate themselves with increasing rigor.

This can be compared to the existing solution for conventional (PSTN) telephone systems, where the end-user is given a single number. The end-user can choose whether or not to be listed in a telephone directory, which is in principle visible to anyone. The approach described here can enable the provision of more flexible solutions.

This approach also decouples the security-level classification from its implementation, so that any particular security level can be implemented in a variety of ways, depending on the service and the transaction technology.

For example, a service delivered over a fixed wire is naturally 'personal', without the need for a separate Authentication component. However access to the same service through the Internet will typically require additional authentication, such as a user name and password, to reach the same level of security.

Whether the fixed wire access is also 'Private' depends on the technology being used. Voice over PSTN can be considered 'Private', whereas data services, including VoIP, may require further security functions, such as encryption, to achieve the same result.

Use Case: A use case will now be described which illustrates, by way of example, the application of the described product model to a real-world scenario.

One advantage of the product model solution described herein is that it can simplify the product upgrade process, where the time and effort required to deliver a higher value product to the end-user is kept to a minimum. The present use case illustrates this. The use case is concerned with two products: a Voice-over-IP product (VoIP) and a Videophone product (Vp).

The Videophone (Vp) product can be a natural enhancement to a VoIP service. In the present example, the Vp product is targeted at personal, residential use for family and friends. A typical use is to allow grandparents and grandchildren to maintain a more personal contact from their different homes. When both locations have engineered connections to the same service provider, the QoS may be sufficient to allow large screen TVs to be used as wall screens.

The product is based on delivering Vp to the end-user's home computer, set-top box, or specialist CPE. These will typically be variations in the Product Family. Further variations may specify different connection options such as engineered broadband, mobile and access from other service providers through the Internet. Many of the other components, such as security and address book, remain the same, regardless of the connection option.

Other users can connect to the Vp service to create a many-way Vp conversation. A special case is for the end-user himself or herself to access their Vp service from a remote site, to let a mobile worker keep in touch with their family when away from home, for example.

The use case relates to an upgrade from an existing VoIP to a Vp service. The main option for the end-user is whether the Vp shares the VoIP capabilities, or whether it is an independent service with dedicated resources.

For the Vp product, the Public Label component will typically have a more secure 'Private' address option, compared to a fully open one for VoIP, because Vp allows visual access to the end-user's home and family. This address may require callers to be authenticated by the Service Provider in order to gain access, and all such individuals must then be in the end-user's address book. Adding people to the list of authorized callers is the responsibility of the end-user and is managed as an end-user transaction within the Address Book (Content Delivery) component. The service provider guarantees the authorization function against this list.

The session management for Vp is typically more complex than voice. It may be necessary to have different conditions that determine when to deliver video and when to deliver voice only: for example, a session may start with voice only to confirm the caller's identity.

Product Definitions: The following describes the VoIP and Vp products in terms of their Service Components. These are expressed using the service component prototypes set out above, to give a useful meaning to the product definition and so make the portfolio management process easier to understand.

This example does not consider pure SML components, but looks only at the resource component layer (e.g. connection components and IT components).

The resource management policy illustrated in this use case is one where individual, dedicated resources are assigned for connections that have a different CoS or endpoints. The separate connections allow the telecommunications service to closely manage the capacity through the network. It allows the video and voice payload to be switched at the local metro node, while sending the low bandwidth control channel to a central routing function. It also allows CoS differentiation to be managed in the network, ensuring the extra resources required to deliver real time VBR are not wasted by carrying best efforts UBR traffic.

The following is an example definition of a VoIP Product Family given in terms of (a hierarchy of) Service Components (SP=Service Provider):
Voice connection capability
  Access Connection—Voice—peak rate 20 kbit/s, VBR (rt)
  Connection to domain—SP's VoIP network
Voice Signaling capability
  Access Connection—Control Channel—peak rate 6 kbit/s UBR
  Content Delivery—VoIP Manager
Messaging capability
  Access Connection—Control Channel—peak rate 6 kbit/s UBR
  Content Delivery—VoIP Messenger
Content Delivery—Address Book
Public Label—Public (Level 0)
Authentication—Private (Level 3)

The following is an example definition of a Vp Product Family, again in terms of its constituent Service Components:
Voice connection capability
  Access Connection—Voice—peak rate 20 kbit/s, VBR (rt)
  Connection to domain—SP's VoIP network
Video Telephony connection capability
  Access Connection—Basic Data—230 kbit/s, UBR
  Connection to domain—SP's Vp network (the Access connection is specified to a network domain as the other end-point)
Signaling capability
  Access Connection—Control Channel—peak rate 6 kbit/s UBR
  Content Delivery—Vp Manager
Messaging capability
  Access Connection—Control Channel—peak rate 6 kbit/s UBR
  Content Delivery—Vp Messenger
Content Delivery—Address Book
Public Label—Private (Level 3)
Authentication—Secure (Level 4)

As the above examples show, many of the IT Service Components can be used on their own, without being part of a structured end-user capability. This is usually because they can be accessed through the Internet, or from other carriers. In both cases the service is accessed through a PoP (point-of-presence) and makes use of the Authentication component.

For example, a connection to the Address Book is not specified. It can be reached through the Internet and makes use of the Authentication component to control access.

The Service Components will typically have many other parameters, but this overview restricts itself to a few prominent ones that help in comparing the two products. So in the above, for the Public Label and Authentication components, only a security rating parameter is specified.

The Product Family defines the full set of capabilities with the fullest range of parameters available to the Service Components.

Individual products within the family are subsets of the full capability, likely to be defined with fewer Service Components and more tightly bound parameters. For example an Internet version of the products could be defined with:
  No voice or video connection capability
  No Access Connection components for the signaling and messaging capabilities
  The Content Delivery components are then instead reached through the Internet, using the Authentication component for access.

The voice and video connection capabilities consist of only a single Access Connection component. The order entry process defines the user-premises end of the connection. The product defines the other end to be either the VoIP or Vp networks. This is equivalent to saying that a PSTN service must connect to a voice switch. There will usually be little or no value in further specifying this within the product definition. The fulfillment process will resolve the network end to a port on a selected edge device within the specified network.

The signaling and messaging have been described here as separate capabilities. This allows them to be delivered from different network locations, using different Content Delivery components. However, an equally valid solution would be to combine both capabilities into a single Manager, with the messenger features as part of the Manager options.

The messaging service will have options for different quality video recordings and different sizes of mailbox. The messages themselves use the VoIP or Vp service to deliver and record messages.

Other, additional capabilities could easily be added to both products as part of the Portfolio Management process. Conferencing is likely to be part of the Manager function, activated by permissions, but an always-on home monitoring function could be another, optional Content Delivery capability.

The Products completely specify the bandwidth and QoS requirements for the connections, so these are not Order options. The requirement for Vp is for a 256 kbit/s connection using two different CoS; UBR and VBR(rt). Note that this is a higher quality service than a broadband 256 kbit/s connection, which will only have UBR CoS.

This bandwidth could be set either by the requirements of the Vp and VoIP applications, or by a predetermined access bandwidth, allocated based on the telecommunications service's policy and available network resources. Some applications may demand higher quality connections than others, but it is usually possible to deliver an application over a predetermined bandwidth as long as the trade-off with quality is understood.

Provisioning: In the present upgrade scenario, the VoIP product is already in place and the set of resources specified for the VoIP service are already allocated to the end-user.

The Order for the Vp product will reach the provisioning system from the Order Entry Process. It contains end-user information identifying the end-user and their location. Existing services and the serving location are identified, typically from a separate network resource/service inventory (e.g. inventory 62, FIG. 1).

In this example, the order specifies whether the end-user wants to share the Vp service with the VoIP, or purchase a second dedicated service. This will not only affect the connection requirements, but also whether additional Label or session management components are required.

The first step is to check the capacity of the existing connection to the end-user. If the existing technology bearer, such as a DSLAM or MSAN connection, has sufficient free capacity to support the new service, the provisioning process will proceed in the resource management layer, and will be dependent on whether the Vp service replaces the existing VoIP, or is a separate, additional service.

New Resource Selection: In principle, the test for available capacity may fail for a number of reasons.

The existing voice service is delivered by PSTN, not VoIP

The existing technology does not have the reach to support the higher bandwidth

Other services, such as a dedicated Internet service, are consuming the bandwidth of the technology bearer For the purposes of this example, it will be assumed that the original voice service is delivered using PSTN, so a new access technology is required.

Referring back to FIG. 6, in this case the IDP layer 380 of the fulfillment process 350 steps through the Technology Options representing the technologies available to support the specified Access Connection Service Component, according to their priority ranking, as recorded in the Service Catalogue 106. IDP 380 identifies the highest-ranked technology that is present at the serving location and is capable of supporting all the existing services, plus the additional Vp service.

In the current example, MSAN is the highest-priority technology and is capable of delivering the Vp service.

The Management Model 382 is tested to see if an MSAN is present at the exchange serving the end-user. In this example, the model states that it is not.

ADSL is the second choice after MSAN (according to the priorities specified for the Technology Options in the service catalogue) and is capable of satisfying the Vp product requirement. IDP 380 therefore selects this as the technology to implement the Service Component at the end-user site. Note that the Vp product is symmetric, but ADSL is an asymmetric service. IDP will therefore need to ensure that the necessary upstream bandwidth is available.

xDSL technologies have limited reach, so there is an additional requirement to qualify the end-user premises. This is a test function, which may be carried out in advance (pre-qualification), or on demand. There are options as to how the results of the qualification test can be used in the provisioning process. The test systems may be directly queried, or the data may be held in IDP's Management Model 382. The second option is preferred for efficiency. The qualification step is required to confirm the bandwidth available to the end-user premises.

In most cases, the DSLAM will have been deployed with a connection to the ISP, so it is only necessary to adapt the Access Connection into the appropriate ATM VP (Virtual Path) to provide connectivity to the Service Provider of the Vp service.

The existing PSTN service would also need to be ceased.

If in the above example ADSL were not available, then IDP 380 would preferably report back to the order entry process 360 that the required service is not available. IDP 380 may be able to offer a lower quality service, based on the available technology and the Service Components that the technology supports. For example, IDP could offer back a restricted QoS service over an existing ISDN connection, assuming that the technology was present at the serving site.

Implementing Vp as a Service Upgrade: In this scenario, Vp replaces the VoIP service.

The end-user can choose to keep the same Public Label as the previous VoIP service, but in this example the security level of the Label is upgraded to 'Private', which restricts callers to a known list within the address book and requires them to authenticate themselves. This means it may be preferable to have a separate Label for the Vp service and continue to use the existing Label for voice-only calls.

Choices of this kind may be Order Entry options for a product, or may be expressed as separate products in the product model, depending on requirements. For example, a separate 'Private' Vp product could be defined within the Vp family, which could also be used to package together other desirable features for such a service.

The security level of the Authentication component should be higher than that of the Label component, because Authentication gives administration rights over the service. This is therefore upgraded to 'Secure'. The requirement for this change comes directly from the product definition. A relationship (or constraint) is defined between the security parameters of the Public Label and Authentication components which forces the Authentication component's security level to be greater than that of the Label component. This relationship is typically defined in the Product Family.

These upgrades are provisioned by an Authentication Domain, within the IT platform. IDP 380 will direct the Resource Order to the correct platform using information from the existing service.

The Address Book capability continues as before. This may be based on a combination rule defined in the Service Component, e.g.:

Combining two products, each of which defines an Address Book, results in a single Address Book.

The VoIP signaling capability is ceased and a new Vp capability is provisioned. This will include support for voice-only calls as part of its session management. The design decision comes from a combination rule defined for these Service Components, e.g.:

Combining two products with a VoIP Manager and Vp Manager results in a requirement for a Vp Manager These are examples where Service Components should preferably have explicit comparator relationships (see above).

The voice connection continues as before.

A video telephony connection is ordered from the video platform, with the end-user location information that is received from the Order, or using the service inventory of the existing VoIP service.

The above, simplified overview of the provisioning process illustrates how rules stored within the product model and the IDP provisioning system can automate product upgrades and make use of reusable resource capacity.

The results of the IDP design process 380 are either new, or modified Resource Instances (see FIG. 8). An existing resource may need to be enhanced to support higher maximal values for certain parameters in order to support additional services. For example, if the bandwidth requirements for the Vp voice connection where higher than for VoIP voice connection, then that Resource Instance would need to be enhanced from the 20 kbit/s value.

IDP 380 will send out technology specific orders to DMs 390 as a result of the design process. This will order changes to each of the technology domains, to reflect the changes in the Resource Instances modeled in IDP.

IDP will message back to the SML 370 once all the orders have been accepted and validated by the DMs 390. This will usually not indicate completion of the orders, but that the orders can be completed.

On completion of all the Orders within the DMs 390, the DMs will return the specific end ports and frame appearances for the connection components and server platforms for the IT components. IDP will message back to the SML 370 and add the additional detail to its service model. In this specific use case, no physical changes to the service end-points are needed, but additional data channels and IT components will be allocated.

Progressing Vp as an Additional Service: If the Vp is an additional service, all new Service Components need to be provisioned.

The Address Book is an exception as the end-user may choose to maintain a single Address Book for all their services. Vp will appear as an additional option in the Address-Book, to allow the end-user to give individuals access to their Vp service.

The underlying technology bearer of the Access Connection Service Components, typically from a DSLAM or MSAN, will continue to be used. These technologies have bandwidth ceilings of over 8 Mbit/s, so there will be sufficient headroom for the additional Resource Instances on the existing technology bearers. In this situation, new connections will be provisioned that occupy their own bandwidth within the bearer. This means there will be a dedicated channel for the VoIP service and the voice component of the Vp service, so that both can be used simultaneously.

It may be that the additional, dedicated service requires greater bandwidth than the technology can carry. This may be because of reach problems limiting the available bandwidth of the technology. In this case, it may be possible to reuse the existing physical bearer, the copper pair, but connect to a more capable technology.

Summary: The product modeling approach described above seeks to model telecommunications products in three layers. The aim is to separate (by loose coupling) products offered into the market from the technologies that are used to deliver them. One result of this approach to product modeling can be the removal of unnecessary dependencies between products and technologies. Each can be changed and optimized independently, without the risk and complexity of disrupting the other.

The first layer consists of the telecommunications Products which are offered into the market place. The products are created by a portfolio management process. There may be an arbitrarily large number of these, to suit each market condition, potentially even focusing in on the individual end-user.

The next layer is composed of Service Components. These are a small and stable set of fundamental capabilities of the telecommunications service that can be mixed, matched and parameterized to create any product offering. Service Components precisely define the capability end-users receive from the telecommunications service. Individual components map onto the layering in the fulfillment process; either to the service management layer (SML), or to the resource provisioning layer, which manages network and IT technologies. Usually, no component spans both, giving a clear separation of responsibility between user-facing components and those that consume network resources. This can free resource management processes to achieve optimized utilization of resources using automated inventory management techniques.

Products, and their Service Components, are modeled in a way that conveys what they do for the end-user, rather than the technology with which they are implemented. This enables portfolio managers to define products in terms which are meaningful to end-users. The end-user is not forced to select technology options that they neither understand, nor care about.

Technology Options form the third layer in the product model. They define technologies in terms of the extent to which they are usable for implementing a Service Component. The service provider can then compare different technologies on a like-for-like basis and see directly the value of its resource investments to end-users.

This product modeling approach can be applied to a wide range of telecommunications services, but is particularly suited to services involving media-rich Next Generation Networks (NGNs). These combine data networks with IT servers to form Information and Communication Technology (ICT) platforms that deliver media-rich content to the end-user. This can lead to a significant increase in the complexity of both product management and fulfillment. The product modeling approach described here can help to reduce this complexity and can enable the use of efficient, highly manageable data driven processes within both product management and fulfillment processes.

Furthermore, automation of the provisioning process can be enhanced by defining standard, re-usable provisioning processes for the defined Service Components.

In addition to these general advantages, the product modeling approach described herein can have a number of more specific benefits, both to the end-user of the telecommunications service and to the service operator. Advantages to the end-user can include:

Product definition can be focused on individual end-user lifestyle and requirements (a 'market of one')

End-users can be provided with an easy route to enhance their services, controlling the ordering/upgrade processes themselves without the need for truck-roll appointments.

New technologies can be rapidly built into existing products, to improve QoS.

Provision and repair times can be reduced, because alternative technology options can be made available Additionally, benefits to the service operator can include:

Products can be built up quickly, by combining predefined Service Components, to meet changing market needs The cost and performance of Products can be estimated accurately as they are created from known, reusable components.

There can be a high degree of confidence that Products defined in this way can be operated efficiently by the telecommunications service, for the same reason.

The provisioning system is free to use the most cost-effective technology to meet the SLA.

The utilization of network resources can be increased

There can be a broader choice of technologies for implementing a given product, which can decrease the average time needed to deliver and repair a service.

End-user services can be enhanced incrementally rather than requiring manual cease and re-provide upgrades.

New technologies can be introduced to reduce cost of service delivery of existing products (rather than being launched as separate products that compete for market share with existing products).

In addition to the provisioning of services, the product model can also support other functions in the telecommunications service, such as a service assurance process for measuring whether actual services provided to the end-user correspond in quality to an ordered product. For example, the service assurance process could use the SLA component (e.g. a bandwidth parameter) of the product definition to determine the response to alarms generated by the network resources as well as to problem reports generated by a service management system.

It will be understood that the present invention has been described above purely by way of example, and modification of detail can be made within the scope of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A computer-implemented method for execution with computer code embodied on a tangible computer readable medium, comprising:

receiving a service request relating to a given user service entity, each user service entity defining a user service available to a user and associated with one or more service component entities defining service functionality aspects of the user service, each service component entity representing a distinct aspect of service functionality providable by a telecommunications system and associated with provisioning information;

identifying one or more service component entities associated with the given user service entity; and for each identified service component entity, accessing provisioning information associated with the service component entity and provisioning the service functionality aspect defined by the service component entity in accordance with the retrieved provisioning information;

wherein at least one of the service component entities is associated with a plurality of alternative implementation technology entities;

wherein one of the alternative implementation technology entities is selected in dependence on a predetermined criterion;

wherein priority information is assigned to the alternative implementation technology entities, and the predetermined criterion comprises the priority information;

wherein identifying one or more service component entities and accessing provisioning information comprise accessing a database, the database comprising:

entities defining service components, each service component entity representing a distinct aspect of service functionality providable by the telecommunications system;

entities defining implementation technologies, each implementation technology entity being associated with a service component entity and representing a technology usable for implementing the aspect of service functionality represented by the service component entity; and entities defining user services available to users of the telecommunications system, each user service entity being associated with one or more service component entities defining the service functionality aspects of the user service;

wherein the alternative implementation technology entities includes a first alternative implementation technology entity and a second alternative implementation technology entity, and where a higher priority is assigned to the second alternative implementation technology entity than the first alternative implementation technology entity, in order to assist in a phasing out of the first alternative implementation technology entity.

2. The method of claim 1, wherein accessing provisioning information and provisioning the service functionality aspect comprises:

accessing implementation data specifying a plurality of implementation technologies usable for implementing an aspect of a specified user service, the specified user service relating to the given user service entity;

selecting one of the implementation technologies specified by the implementation data; and implementing the aspect of the specified user service in the network using the selected implementation technology.

3. The method of claim 2, wherein:

selecting one of the implementation technologies comprises for each identified service component entity identifying an implementation technology entity associated with the identified service component entity, and implementing the aspect of the specified user service comprises implementing the service functionality aspect represented by the service component entity using the implementation technology defined by the identified implementation technology entity.

4. The method of claim 3, wherein the plurality of alternative implementation technology entities represents alternative implementation technologies, each alternative implementation technology being independently usable for implementing the aspect of service functionality represented by the given service component entity.

5. The method of claim 4, further comprising:

implementing the service functionality aspect represented by the given service component entity using the implementation technology specified by the selected implementation technology entity.

6. The method of claim 5, comprising storing one or more rules relating to the alternative implementation technology entities, wherein selecting one of the alternative implementation technology entities comprises evaluating the rule or rules and selecting an implementation technology entity in dependence on the outcome of the evaluation.

7. A system including a tangible computer readable medium, comprising:

a processor; and a processor readable medium comprising instructions translatable by the processor for:

receiving a service request relating to a given user service entity, each user service entity defining a user service available to a user and associated with one or more service component entities defining service functionality aspects of the user service, each service component entity representing a distinct aspect of service functionality providable by a telecommunications system and associated with provisioning information;

identifying one or more service component entities associated with the given user service entity; and for each identified service component entity, accessing provisioning information associated with the service component entity and provisioning the service functionality aspect defined by the service component entity in accordance with the retrieved provisioning information;

wherein the system is operable such that at least one of the service component entities is associated with a plurality of alternative implementation technology entities;

wherein the system is operable such that one of the alternative implementation technology entities is selected in dependence on a predetermined criterion;

wherein the system is operable such that priority information is assigned to the alternative implementation technology entities, and the predetermined criterion comprises the priority information;

wherein the system is operable such that identifying one or more service component entities and accessing provisioning information comprise accessing a database, the database comprising:

entities defining service components, each service component entity representing a distinct aspect of service functionality providable by the telecommunications system;

entities defining implementation technologies, each implementation technology entity being associated with a service component entity and representing a technology usable for implementing the aspect of service functionality represented by the service component entity; and entities defining user services available to users of the telecommunications system, each user service entity being associated with one or more service component entities defining the service functionality aspects of the user service;

wherein the alternative implementation technology entities includes a first alternative implementation technology entity and a second alternative implementation technology entity, and where the system is operable such that a higher priority is assigned to the second alternative implementation technology entity than the first alternative implementation technology entity, in order to assist in a phasing out of the first alternative implementation technology entity.

8. The system of claim 7, wherein accessing provisioning information and provisioning the service functionality aspect comprises:

accessing implementation data specifying a plurality of implementation technologies usable for implementing an aspect of a specified user service, the specified user service relating to the given user service entity;

selecting one of the implementation technologies specified by the implementation data; and implementing the aspect of the specified user service in the network using the selected implementation technology.

9. The system of claim 8, wherein:

selecting one of the implementation technologies comprises for each identified service component entity identifying an implementation technology entity associated with the identified service component entity, and implementing the aspect of the specified user service comprises implementing the service functionality aspect represented by the service component entity using the implementation technology defined by the identified implementation technology entity.

10. The system of claim 9, wherein the plurality of alternative implementation technology entities represents alternative implementation technologies, each alternative implementation technology being independently usable for implementing the aspect of service functionality represented by the given service component entity.

11. The system of claim 10, the instructions further translatable for:

implementing the service functionality aspect represented by the given service component entity using the implementation technology specified by the selected implementation technology entity.

12. The system of claim 11, comprising storing one or more rules relating to the alternative implementation technology entities, wherein selecting one of the alternative implementation technology entities comprises evaluating the rule or rules and selecting an implementation technology entity in dependence on the outcome of the evaluation.

13. A tangible computer readable medium, comprising instructions executable for:

receiving a service request relating to a given user service entity, each user service entity defining a user service available to a user and associated with one or more service component entities defining service functionality aspects of the user service, each service component entity representing a distinct aspect of service functionality providable by a telecommunications system and associated with provisioning information;

identifying one or more service component entities associated with the given user service entity; and for each identified service component entity, accessing provisioning information associated with the service component entity and provisioning the service functionality aspect defined by the service component entity in accordance with the retrieved provisioning information;

wherein the instructions are operable such that at least one of the service component entities is associated with a plurality of alternative implementation technology entities;

wherein the instructions are operable such that one of the alternative implementation technology entities is selected in dependence on a predetermined criterion;

wherein the instructions are operable such that priority information is assigned to the alternative implementation technology entities, and the predetermined criterion comprises the priority information;

wherein the instructions are operable such that identifying one or more service component entities and accessing provisioning information comprise accessing a database, the database comprising:

entities defining service components, each service component entity representing a distinct aspect of service functionality providable by the telecommunications system;

entities defining implementation technologies, each implementation technology entity being associated with a service component entity and representing a technology usable for implementing the aspect of service functionality represented by the service component entity; and entities defining user services available to users of the telecommunications system, each user service entity being associated with one or more service component entities defining the service functionality aspects of the user service;

wherein the alternative implementation technology entities includes a first alternative implementation technology entity and a second alternative implementation technology entity, and where the instructions are operable such that a higher priority is assigned to the second alternative implementation technology entity than the first alternative implementation technology entity, in order to assist in a phasing out of the first alternative implementation technology entity.

14. The computer readable medium of claim 13, wherein accessing provisioning information and provisioning the service functionality aspect comprises:
   accessing implementation data specifying a plurality of implementation technologies usable for implementing an aspect of a specified user service, the specified user service relating to the given user service entity;
   selecting one of the implementation technologies specified by the implementation data; and
   implementing the aspect of the specified user service in the network using the selected implementation technology.

15. The computer readable medium of claim 14, wherein:
   selecting one of the implementation technologies comprises for each identified service component entity identifying an implementation technology entity associated with the identified service component entity, and
   implementing the aspect of the specified user service comprises implementing the service functionality aspect represented by the service component entity using the implementation technology defined by the identified implementation technology entity.

16. The computer readable medium of claim 15, wherein the plurality of alternative implementation technology entities represents alternative implementation technologies, each alternative implementation technology being independently usable for implementing the aspect of service functionality represented by the given service component entity.

17. The computer readable medium of claim 16, further comprising:
   implementing the service functionality aspect represented by the given service component entity using the implementation technology specified by the selected implementation technology entity.

18. The computer readable medium of claim 17, comprising storing one or more rules relating to the alternative implementation technology entities, wherein selecting one of the alternative implementation technology entities comprises evaluating the rule or rules and selecting an implementation technology entity in dependence on the outcome of the evaluation.

19. A computer-implemented method for execution with computer code embodied on a tangible computer readable medium, comprising:
   storing, in a service information database, entities defining service components, each service component entity representing a distinct aspect of service functionality providable by a telecommunications system;
   storing in the database entities defining implementation technologies, each implementation technology entity being associated with a service component entity and representing a technology usable for implementing the aspect of service functionality represented by the service component entity; and
   storing in the database entities defining user services available to users of the telecommunications system, each user service entity being associated with one or more service component entities defining service functionality aspects of the user service;
   wherein at least one of the service component entities is associated with a plurality of alternative implementation technology entities;
   wherein one of the alternative implementation technology entities is selected in dependence on a predetermined criterion;
   wherein priority information is assigned to the alternative implementation technology entities, and the predetermined criterion comprises the priority information;
   wherein the alternative implementation technology entities includes a first alternative implementation technology entity and a second alternative implementation technology entity, and where a higher priority is assigned to the second alternative implementation technology entity than the first alternative implementation technology entity, in order to assist in a phasing out of the first alternative implementation technology entity.

20. The method of claim 19, further comprising:
   receiving a service request relating to a user service entity;
   identifying one or more service component entities associated with the user service entity; and
   for the one or more identified service component entity, identifying an implementation technology entity associated with the identified service component entity; and
   implementing the service functionality aspect represented by the service component entity using the implementation technology defined by the identified implementation technology entity.

21. The method of claim 20, further comprising implementing the service functionality aspect represented by the given service component entity using the implementation technology specified by the selected implementation technology entity.

22. The method of claim 19, wherein:
   at least one of the service component entities is associated with a parameter relating to the corresponding service functionality aspect; and
   at least one of the alternative implementation technology entities associated with the at least one service component entity specifies a constraint on the parameter defining a condition under which the implementation technology represented by the implementation technology entity is usable to implement the service functionality aspect; and
   wherein the method comprises selecting one of the alternative implementation technology entities in dependence on the constraint or constraints.

23. The method of claim 22, comprising receiving a requirement constraint relating to the parameter and specifying a requirement for the service functionality which is to be implemented, the selecting step comprising comparing the requirement constraint to one or more constraints specified by the alternative implementation technology entities, and selecting one of the alternative implementation technology entities in dependence on the outcome of the comparison.

24. The method of claim 23, comprising identifying a network location involved in the implementation of the service functionality aspect represented by the at least one service component entity, receiving information relating to technology resources available at the network location, and selecting one of the alternative implementation technology entities in dependence on the received information.

25. The method of claim 24, comprising managing migration from a first technology represented by a first implementation technology entity to a second technology represented by a second implementation technology entity by:
   identifying a service component entity associated with the first implementation technology entity; and
   associating the identified service component entity with the second implementation technology entity.

26. A computer-implemented method for execution with computer code embodied on a tangible computer readable medium, comprising:
- receiving a service request specifying one of a plurality of user services providable to users of a telecommunications network;
- accessing service data corresponding to the specified user service in a service information database;
- retrieving implementation data specifying a plurality of implementation technologies usable for implementing an aspect of the specified user service from the database;
- selecting one of the implementation technologies specified by the implementation data; and
- implementing the aspect of the specified user service in the network using the selected implementation technology;
- wherein the service data comprises a set of service component entities;
- wherein at least one of the service component entities is associated with a plurality of alternative implementation technology entities;
- wherein one of the alternative implementation technology entities is selected in dependence on a predetermined criterion;
- wherein priority information is assigned to the alternative implementation technology entities, and the predetermined criterion comprises the priority information;
- wherein the service information database comprises:
  - entities defining service components, each service component entity representing a distinct aspect of service functionality providable by the telecommunications network;
  - entities defining implementation technologies, each implementation technology entity being associated with a service component entity and representing a technology usable for implementing the aspect of service functionality represented by the service component entity; and
  - entities defining user services available to users of the telecommunications network, each user service entity being associated with one or more service component entities defining service functionality aspects of the user service;
- wherein the alternative implementation technology entities includes a first alternative implementation technology entity and a second alternative implementation technology entity, and where a higher priority is assigned to the second alternative implementation technology entity than the first alternative implementation technology entity, in order to assist in a phasing out of the first alternative implementation technology entity.

27. The method of claim 26, wherein the service data is associated with provisioning rules.

28. The method of claim 27, wherein the implementation data comprises a set of implementation technology entities.

29. A computer-implemented method for execution with computer code embodied on a tangible computer readable medium, comprising
- receiving a request for a user service;
- reviewing service data associated with the user service, wherein the service data represents at least one aspect of service functionality associated with the user service; and
- specifying at least one implementation technology associated with the service data and operable to implement the at least one aspect of service functionality;
- wherein the service data comprises a set of service component entities;
- wherein at least one of the service component entities is associated with a plurality of alternative implementation technology entities;
- wherein one of the alternative implementation technology entities is selected in dependence on a predetermined criterion;
- wherein priority information is assigned to the alternative implementation technology entities, and the predetermined criterion comprises the priority information;
- wherein reviewing service data comprises accessing a database, the database comprising:
  - entities defining service components, each service component entity representing a distinct aspect of service functionality providable by a telecommunications network;
  - entities defining implementation technologies, each implementation technology entity being associated with a service component entity and representing a technology usable for implementing the aspect of service functionality represented by the service component entity; and
  - entities defining user services available to users of the telecommunications network, each user service entity being associated with one or more service component entities defining service functionality aspects of the user service;
- wherein the alternative implementation technology entities includes a first alternative implementation technology entity and a second alternative implementation technology entity, and where a higher priority is assigned to the second alternative implementation technology entity than the first alternative implementation technology entity, in order to assist in a phasing out of the first alternative implementation technology entity.

30. The method of claim 29, wherein specifying at least one implementation technology comprises reviewing implementation data associated with the service data.

31. The method of claim 30, further comprising implementing the at least one aspect using the specified implementation technology.

* * * * *